United States Patent [19]
Koyama et al.

[11] Patent Number: 5,234,792
[45] Date of Patent: Aug. 10, 1993

[54] OPTICAL DATA RECORDING MEDIUM AND MANUFACTURING METHOD THEREOF

[75] Inventors: Eiji Koyama, Tsuchiura; Akira Gotoh, Toride; Shuhei Nakamichi, Ibaraki; Ryoichi Sudo, Yokosuka; Hiroaki Miwa, Fujisawa, all of Japan

[73] Assignees: Hitachi Maxell, Ltd., Osaka; Hitachi, Ltd., Tokyo, both of Japan

[21] Appl. No.: 928,650

[22] Filed: Aug. 17, 1992

Related U.S. Application Data

[63] Continuation of Ser. No. 433,340, Nov. 8, 1989, abandoned.

[30] Foreign Application Priority Data

Nov. 9, 1988 [JP] Japan .................. 63-281444
Nov. 11, 1988 [JP] Japan .................. 63-285092
Dec. 26, 1988 [JP] Japan .................. 63-326023

[51] Int. Cl.⁵ .................. G03C 1/72; G11B 7/24
[52] U.S. Cl. .................. 430/270; 430/271; 430/273; 430/495; 430/945
[58] Field of Search .......... 430/270, 271, 273, 275, 430/276, 495, 913, 945; 346/1.1, 135.1, 137

[56] References Cited

U.S. PATENT DOCUMENTS

| | | | |
|---|---|---|---|
| 4,456,659 | 6/1984 | Sudo et al. | 428/447 |
| 4,635,076 | 1/1987 | Willson et al. | 430/945 |
| 4,692,402 | 9/1987 | Bouldin et al. | 430/945 |

FOREIGN PATENT DOCUMENTS

0213307 3/1987 European Pat. Off. .
3505355 8/1985 Fed. Rep. of Germany .

OTHER PUBLICATIONS

Chen et al. "Subbing Layer for Ablative Optical Recording" IBM Technical Disclosure, 1982, p. 2877.
European Search Report with Annex.
Technical Disclosure Bulletin, IBM, vol. 25, No. 6, Nov., 1982, Subbing Layer for Ablative Optical Recording, M. Chen, W. Y. Lee and A. W. Wu.

*Primary Examiner*—Marion E. McCamish
*Assistant Examiner*—Kathleen Duda
*Attorney, Agent, or Firm*—Birch, Stewart, Kolasch & Birch

[57] ABSTRACT

This invention is related to an optical data recording medium of a high reliability and a large capacity, preventing moisture absorption and swelling of a resin layer formed on one side of a transparent substrate, and related to a method for manufacturing thereof whatever the optical data recording medium comprises at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin resulting in an optical data recording medium having a reduced absorbing moisture of the transferred layer thereof and whatever the ratio of swelling ($\Delta d/d$) is restricted to 0.1% or less.

19 Claims, 13 Drawing Sheets

FIG. 7

| | COMPOUND | \multicolumn{14}{c}{EXAMPLES} |
| | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| a | COMPOUND 1 | 30 | 0 | 0 | 40 | 30 | 0 | 35 | 30 | 0 | 30 | 0 | 0 | 0 | 30 |
|   | COMPOUND 2 | 0 | 30 | 0 | 0 | 0 | 0 | 0 | 0 | 0 | 0 | 50 | 0 | 5 | 0 |
|   | COMPOUND 3 | 0 | 0 | 25 | 0 | 0 | 25 | 0 | 0 | 10 | 0 | 0 | 55 | 0 | 0 |
| b | COMPOUND 4 | 40 | 0 | 0 | 0 | 45 | 0 | 0 | 55 | 0 | 0 | 0 | 0 | 60 | 0 |
|   | COMPOUND 5 | 0 | 45 | 0 | 0 | 0 | 0 | 35 | 0 | 0 | 0 | 0 | 25 | 0 | 0 |
|   | COMPOUND 6 | 0 | 0 | 50 | 35 | 0 | 45 | 0 | 0 | 60 | 30 | 0 | 0 | 0 | 0 |
|   | COMPOUND 7 | 0 | 0 | 0 | 25 | 0 | 0 | 0 | 0 | 0 | 0 | 0 | 0 | 0 | 0 |
| c | COMPOUND 8 | 30 | 0 | 25 | 0 | 25 | 30 | 30 | 15 | 40 | 40 | 30 | 20 | 35 | 25 |
|   | COMPOUND 9 | 0 | 25 | 0 | 0 | 0 | 0 | 0 | 0 | 0 | 0 | 20 | 20 | 0 | 45 |
| d | PHOTO POLYMERIZER | 2 | 2 | 2 | 2 | 2 | 2 | 2 | 2 | 2 | 2 | 2 | 2 | 2 | 2 |

PRIOR ART

OPTICAL DATA RECORDING MEDIUM AND MANUFACTURING METHOD THEREOF

This application is a continuation, of application Ser. No. 07/433,340 filed on Nov. 8, 1989, now abandoned.

BACKGROUND OF THE INVENTION

1. Field of the Invention

The present invention relates to an optical data recording medium such as, for example, an optical disc or the like and a manufacturing method thereof, and more specifically, to a means for preventing moisture absorption and swelling of a resin layer formed on one side of a transparent substrate.

2. Prior Art

Conventionally, there has been known an optical disc of an MCAV (modified constant angular velocity) rotation drive system or MCLV (modified constant linear velocity) rotation drive system which has a recording capacity larger than that of an optical disc of a CAV (constant angular velocity) rotation drive system and can access at a speed higher than that of an optical disc of a CLV (constant linear velocity) rotation drive system.

FIGS. 18 and 19 shows an example of the conventionally proposed optical disc of the MCAV or MCLV system.

FIG. 18 is a plan view of this optical disc, wherein a ring-shaped area 3 of a disc-shaped substrate 2 having a center hole 1 except the innermost and outermost circumferences thereof serves as a recording area. The recording area 3 is divided into a plurality of blocks 4a, 4b, 4c ... 4x each area having a different radial and further each of the blocks 4a, 4b, 4c ... 4x is divided in the circumferential direction into a plurality of sectors 5a, 5b, 5c ... 5x. Each of the sectors 5a, 5b, 5c, ... 5x has the substantially same length and the number of the sectors of the outermost circumferential block 4x is designed to be about twice the number of the sectors of the intermost circumferential block 4a.

The recording area 3 has microminiature guide grooves of a line width of about 0.3 μm–0.8 μm having a constant track pitch defined concentrically or spirally from the innermost circumferential portion to the outermost circumferential portion thereof (not shown in FIG. 18) to enable recording/reproducing light to be tracked. A prepit is formed on the head portion of each of the sectors 5a, 5b, 5c ... 5x on the guide grooves or between two guide grooves adjacent each other to indicate the address or the like of the sector. The group of the prepits seems to be disposed linearly along the boundary of each separated sector, as shown by numeral 6, when the optical disc is obtained from the flat surface direction thereof.

As described above, since the optical disc of the MCAV system or MCLV system has the recording area divided into a plurality of the blocks 4a, 4b, 4c ... and further the respective blocks are divided into the different sectors, this optical disc does not have prepits disposed linearly from the innermost circumferential portion to the outermost circumferential portion of the recording areas like the optical disc of the CAV system, and thus, as shown in FIG. 18, there is formed an area 7 where a prepit is disposed next to a guide groove in the boundary portion of each of the blocks 4a, 4b, 4c ... 4x.

FIG. 19 is a cross sectional view of a main part of this optical disc, wherein a photo-curing resin layer 10 is formed on one side of a substrate 2 composed of a flat and disc-shaped glass plate, prepits 8 and guide grooves (pregrooves) 9 are transferred on the photo-curing resin layer 10 and at least a thin film layer 11 including a recording film or a reflecting film is formed on the photo-curing resin layer 10. The prepit 8 is formed to a trapezoidal groove shape having a depth of λ/4 n, where λ represents a wavelength of recording/reproducing light and n represents a refraction factor of the photo-curing resin layer 10 and the guide groove 9 is formed to a V-shaped having a depth of about λ/6 n–λ/8 n, where λ represents a wavelength of recording/reproducing light and n represents a refraction factor of the photo-curing resin layer 10.

In the MCAV system, a recording capacity is increased in such a manner that the above optical disk is rotated at a constant angular velocity and the closer to the outer circumference the blocks are located, the more the length of a writing signal to a data signal having the same signal length is reduced.

On the other hand, in the MCLV system, a recording capacity is increased in such a manner that the length of a writing signal to a data signal having the same signal length is kept constant regardless the blocks are located closer to the inner circumference or the outer circumference and the closer to the outer circumference the blocks are located the more the rpm of the disc is reduced.

In general, the thin film layer 11 including the recording film is formed by a sputtering method or a vacuum vapor deposition method because it can efficiently form a thin film and has the high uniformity of the thin film. Since, however, sputtered particles from a target or a vaporized material from a vaporizing source are less penetrated, the sputtered particles or the vaporized material is difficult to be deposited on a side wall 8a of the prepit 8 and thus this portion has a thickness which is much thinner than other portions, as shown in FIG. 19.

When the thin film layer 11 is water-impermeable, water is prevented from permeating through the substrate 2 and the portion where the thin film layer 11 is formed to a desired thickness. Since, however, the photocuring resin used to a conventional optical disk has a high water absorption of 2–3% and thus when the optical disc is left in air, the water in the air permeates into the photo-curing resin layer 10 through the side wall 8a of the prepit 8 where the thin film layer 11 has a very thin thickness, as shown by the arrows A in FIG. 20, so that the photo-curing resin 10 is locally swelled.

Accordingly, in an optical disc in which the prepit 8 is disposed next to the guide groove 9 of an adjacent track like the above optical disc of the MCAV or MCLV system, the guide grooves 9 of a plurality of recording tracks passing through the vicinity of an area adjacent to this prepit 8 is inclined in a radial direction, as shown in FIG. 20.

When this phenomenon arises, the intensity of the light reflected from or passing through the respective surfaces of the V-shaped guide groove 9 is unbalanced to cause track offsets 12, as shown in FIG. 21, so that a tracking noise is produced. As a result, a recording portion (a pit, magnetized domain or the like) is formed in such a manner that it is biased to an adjacent track side so that there is a drawback that a cross-talk is produced and a signal cannot be recorded or reproduced in the worst case.

Although the above description is made with reference to an example such as the optical disc of the MCAV or the MCLV system, the same problems also arise in an optical disc of a so-called CLV system (constant linear velocity system) in which guide grooves are formed concentrically or spirally and prepits are formed along these guide grooves at equal intervals. Further, in an optical disc having an ablation type recording pit, since an area where a recording pit is disposed next to a guide groove of an adjacent track is produced after recording, a drawback similar to that mentioned above may be caused. Furthermore, in a card-shaped optical data recording medium, the same drawback may arise if a preformat is such that there is an area where a guide groove is disposed next to a prepit.

SUMMARY OF THE INVENTION

The first object of the present invention for solving the above drawbacks of a conventional technology is to provide a highly reliable optical data recording medium having a large capacity and the second object thereof is to provide a method of manufacturing this optical data recording medium.

To achieve the above objects, the present invention is directed to a sealed or ventilating type optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin.

The present invention is characterized in that a ratio of swelling ($\Delta d/d$) represented by the rate of an amount of swelling $\Delta d$ of a film thickness d of the resin layer, which is caused when the resin layer absorbs moisture, to the film thickness d of the resin layer at the time of the formation thereof is restricted to 0.1% or less.

In practical use, since the resin layer is used at a film thickness (d) of 5-300 μm and more specifically at a film thickness of 30-100 μm, the present invention is characterized in that the value $\Delta d/d$ is restricted to 0.1% when the resin layer has this film thickness d.

To achieve the above objects, the present invention is further characterized in that an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the resin layer having a film thickness (d) of 30-100 μm at the time of the formation thereof, and a ratio of swelling ($\Delta d/d$) representing the rate of an amount of swelling $\Delta d$ of the film thickness d of the resin layer, which is caused when the resin layer absorbs moisture during fabrication, to the film thickness d of the resin layer is restricted to 0.1% or less.

A method of manufacturing an optical data recording medium is characterized by the steps of forming the resin layer composed of the mixture of an ultraviolet ray absorbing organic compound having the following molecular structural formulas and a photo polymerization initiator, and polymerizing the resin layer by irradiating ultraviolet ray thereto, wherein the resin layer has a film thickness (d) of 30-100 μm at the time of the formation thereof, wherein a ratio of swelling ($\Delta d/d$) representing the rate of an amount of swelling $\Delta d$ of a film thickness d of the resin layer, which is caused when the resin layer absorbs moisture during fabrication, to the film thickness d of the resin layer, is 0.1% or less.

Molecular structural formula:

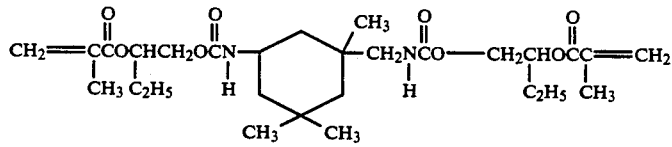

Molecular structural formula:

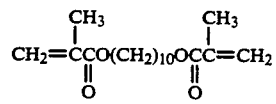

To achieve the above objects, the present invention is further characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formulas and a photo polymerization initiator and polymerizing the resin layer by irradiating with ultraviolet rays, wherein the resin layer has a film thickness (d) of 30-100 μm at the time of the formation thereof and a ratio of swelling ($\Delta d/d$) representing the rate of an amount of swelling $\Delta d$ of a film thickness d of the resin layer, which is caused when the resin layer absorbs moisture during fabrication, to the film thickness d of the resin layer, is 0.1% or less.

Molecular structural formula:

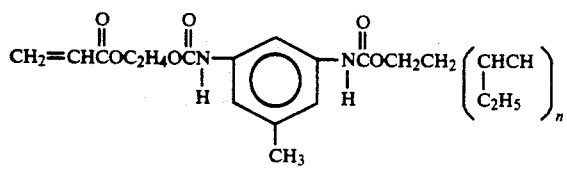 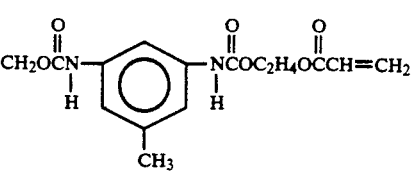

Molecular structural formula:

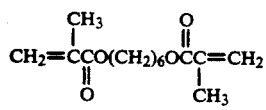

To achieve the above objects, the present invention is further characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formulas and a photopolymerization initiator and polymerizing the resin layer by irradiating with ultraviolet rays, wherein the resin layer has a film thickness (d) of 30–100 μm at the time of the formation thereof and a ratio of swelling (Δd/d) representing the rate of an amount of swelling Δd of a film thickness d of the resin layer, which is caused when the resin layer absorbs moisture during fabrication, to the film thickness d of the resin layer, is 0.1% or less.

Molecular structural formula:

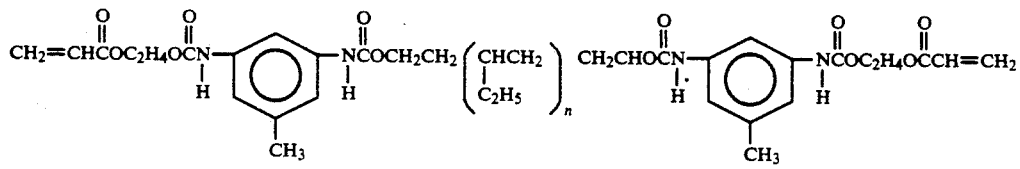

Molecular structural formula:

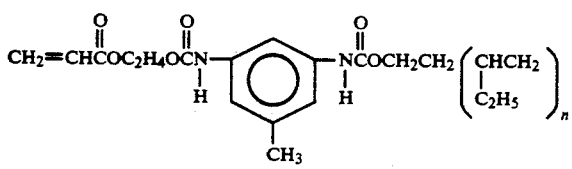

pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formulas and a photo polymerization initiator and polymerizing the resin layer by irradiating with ultraviolet rays, wherein the resin layer has a film thickness (d) of 30–100 μm at the time of the formation thereof and a ratio of swelling (Δd/d) representing the rate of an amount of swelling Δd of a film thickness d of the resin layer, which is caused when the resin layer absorbs moisture during fabrication to the film thickness d of the resin layer, is 0.1% or less.

Molecular structural formula:

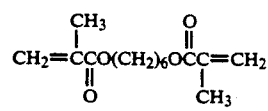

To achieve the above objects, the present invention is characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following

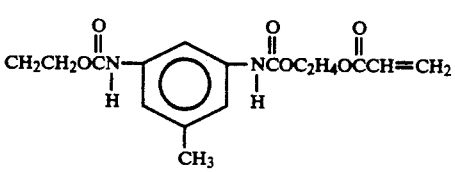

Molecular structural formula:

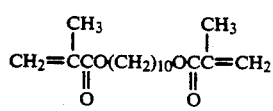

molecular structural formulas and a photo polymerization initiator and polymerizing the resin layer by irradiating with ultraviolet rays, wherein the resin layer has a film thickness d of 30-100 μm at the time of the formation thereof and a ratio of swelling (Δd/d) representing the rate of an amount of swelling Δd of a film thickness d of the resin layer, which is caused when the resin layer absorbs moisture during fabrication, to the film thickness d of the resin layer, is 0.1% or less.

Molecular structural formula:

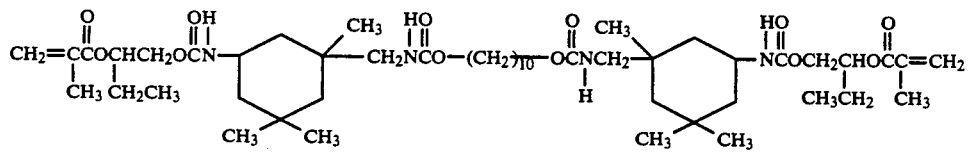

Molecular structural formula:

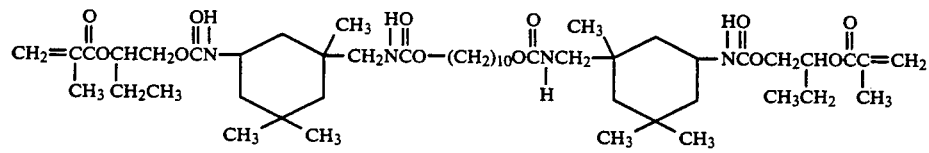

Molecular structural formula:

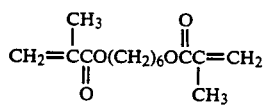

Molecular structural formula:

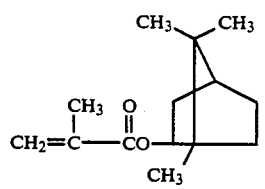

To achieve the above objects, the present invention is characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formula and a photo polymerization initiator and polymerizing the resin layer by irradiating with ultraviolet rays, wherein the resin layer has a film thickness (d) of 30-100 μm at the time of the formation thereof and a ratio of swelling (Δd/d) representing the rate of an amount of swelling Δd of a film thickness d of the resin layer, which is caused when the resin layer absorbs moisture during fabrication, to the film thickness d of the resin layer, is 0.1% or less.

Molecular structural formula:

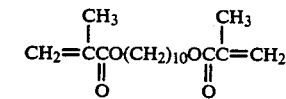

Molecular structural formula:

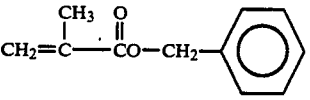

To achieve the above objects, the present invention is characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formulas and a photo polymerization initiator and polymerizing the resin layer by irradiating with ultraviolet rays, wherein the resin layer has a film thickness (d) of 30-100 μm at the time of the formation thereof and a ratio of swelling (66 d/d) representing the rate of an amount of swelling Δd of a film thickness d of the resin layer, which is caused when the resin layer absorbs moisture during fabrication, to the film thickness d of the resin layer, is 0.1% or less.

Molecular structural formula:

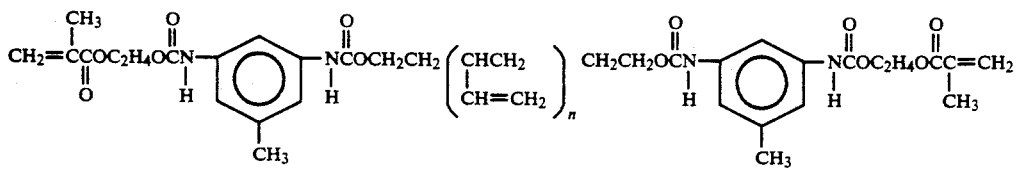

Molecular structural formula:

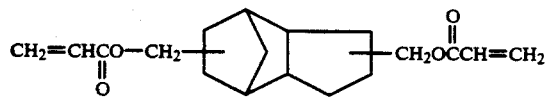

Molecular structural formula;

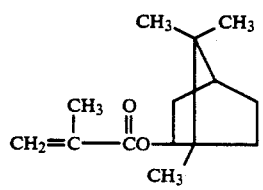

To achieve the above objects, the present invention is characterized in a method of manufacturing an optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the recording layer is isolated from the atmosphere when the fabrication of the optical data recording medium is completed, which comprises the steps of forming the resin layer composed of the mixture of one or more of ultraviolet ray absorbing organic compounds having the following molecular structural formulas and a photo polymerization initiator and polymerizing the resin layer by irradiating ultraviolet ray thereto, wherein the resin layer has a film thickness (d) of 30-100 μm when the resin layer is formed and a ratio of swelling (Δd/d) representing the rate of an amount of swelling Δd of a film thickness d of the resin layer, which is caused when the resin layer absorbs moisture during fabrication, to the film thickness d of the resin layer, is 0.1% or less.

Molecular structural formula:

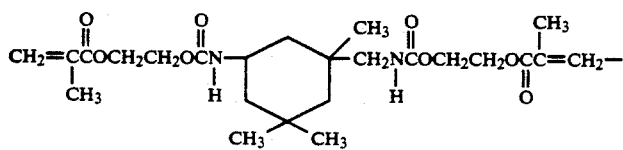

Molecular structural formula:

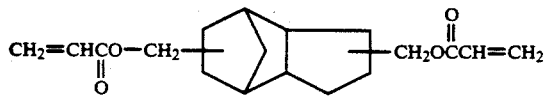

To achieve the above objects, the present invention is further characterized in an optical data recording medium comprising at least a transparent substrate, a transferred layer of a preformat pattern formed on the transparent substrate and a recording layer formed on the transferred layer wherein at least the surface of the transferred layer in contact with the transparent substrate is made of a resin layer composed of an ultraviolet ray curable resin, which comprises the ultraviolet ray curable resin constituting the resin layer being composed of a composition obtained by mixing and curing:

(a) an organic compound having acrylic group or methacrylic group at the end thereof and polybutadiene skeleton or poly-1-butene skeleton at the inner molecule thereof;

(b) an organic compound having one acrylic group or methacrylic group in one molecule thereof and not having such polar group as hydroxy group, carboxylic group, thiol group, amine group, etc. in the molecule;

(c) an organic compound having two or more acrylic groups or methacrylic groups in one molecule and not having such polar group as hydroxy group, carboxylic group, thiol group, amine group, etc. in the molecule; and (d) photo polymerizer.

Further, to achieve the above objects, the present invention is characterized in an optical data recording medium comprising at least a transparent substrate, a transferred layer of a preformat pattern formed on the transparent substrate and a thin film layer formed on the transferred layer, wherein at least the surface of the transferred layer in contact with the transparent substrate is made of a resin layer composed of ultraviolet ray curing resin and at least one thin film having water-impermeability of one or more thin films constituting the above thin film layer is formed to a thickness capable of cutting off water in air over the overall surface of the above transferred layer, i.e., all the surfaces including the side surfaces of prepits.

Further, when the above thin film layer of water-impermeability is formed by a sputtering method, a gaseous pressure in a vacuum chamber is adjusted to $5 \times 10^{-1}$ Pa or more, and when the above thin film layer of water-permeability is formed by a vacuum vapor deposition, a set angle of the above transferred surface to a vaporizing source is changed as time passes. In addition, a plasma chemical vapor deposition method (hereinafter, referred to as a plasma CVD method) is used as a method of forming the above water-impermeable thin film of.

Further, to achieve the above objects, the present invention is characterized in an optical data recording medium comprising at least a transparent substrate, a transferred layer of a preformat pattern formed on the transparent substrate and a thin film layer formed on the transferred layer, wherein the above transferred layer and a recording film underlayer, the resin layer being is made of a resin layer composed of an ultraviolet ray curable resin and the recording film underlayer being composed of an organic compound, the ultraviolet ray curable resin containing lipophilic groups, and has permeability to the organic compound forming the recording film underlayer while not dissolving the organic compound.

When a ratio of swelling ($\Delta d/d$) representing the rate of an amount of swelling $\Delta d$ of a film thickness d of a resin layer, which is caused when the resin layer absorbs moisture, to the film thickness (d) of the resin layer at the time of the formation thereof, is restricted to 0.1% or less, a tracking noise due to the swelling of the resin layer can be lowered to a level which causes no problem in practical applications to thereby prevent a decrease in a recording capacity.

Further, the resin layer composed of a resin material obtained by mixing the organic compounds and the like represented by the above respective molecular structural formulas can restrict a ratio of swelling ($\Delta d/d$) representing the rate of an amount of swelling (d) of a film thickness d of a resin layer, which is caused when the resin layer absorbs moisture, to the film thickness (d) of the resin layer at the time of the formation thereof to 0.1% or less. Therefore, a tracking noise due to the swelling of the resin layer can be lowered to a level which causes no problem in practical applications to thereby prevent a decrease in a recording capacity.

Further, the recording film underlayer obtained by curing the composition containing the above organic compound (a), organic compound (b) and organic compound (c) has a very low water absorption of 0.3%. In addition, the organic compound (a) can provide the recording film underlayer with suitable toughness, the organic compound (b) can reduce the stress in the recording film underlayer to increase the bonding property thereof with a transparent substrate and the organic compound (c) can provide the recording film underlayer with suitable rigidity to improve the exfoliation property thereof from a stamper.

Because of the reasons as described above, the recording film underlayer can be prevented from being swelled, which would otherwise be caused by the absorption of moisture effected by the underlayer, with the result that a tracking noise can be reduced to thereby obtain a reliable optical data recording medium.

Further, when at least one thin film having water-impermeable of one or more thin films constituting the thin film layer is formed to a thickness capable of cutting off water in air over the overall surface of the above transferred layer, i.e., all the surfaces including the side surfaces of prepits, a moisture permeable surface on which a signal pattern is transferred is completely covered by the water-impermeable thin film layer, so that a phenomenon that water in air enters from the side surfaces of the prepits to partially swell the resin layer does not occur. Consequently, a track offset is not produced in an adjacent track so that such drawbacks as a cross talk and inability of recording and reproducing a signal can be overcome.

On the other hand, when a method of sputtering the water-impermeable thin film layer in a vacuum chamber with a high gaseous pressure adjusted to $5 \times 10^{-1}$ Pa, the particles driven out from a target are liable to be collided against the particles in an introduced gas so that the direction in which the sputtered particles advance is dispersed, whereby the thin film layer can be deposited on an varying surface on which a signal pattern is transferred to a substantially uniform thickness.

Further, when used as a method of effecting a vacuum deposition of a water-impermeable thin film layer while changing a set angle of the surface to the vaporing source, the surface on which the signal pattern is transferred as time passes, all the varying surfaces on which the signal pattern is deposited can be faced at right angles without exception to the direction in which vaporized particles advance so that the water-impermeable thin film layer can be deposited on the above transferred surface to a substantially uniform thickness.

Further, since a plasma CVD method forms a film in a gas in which a film forming material is substantially uniformly distributed, the film forming material penetrates into recessed portions so that the thin film layer can be deposited on an varying surface on which the signal pattern is transferred to a substantially uniform thickness.

When an ultraviolet ray curable resin containing lipophilic group is used as the ultraviolet ray curable resin forming a resin layer, the swelling of the resin layer caused by water absorption is restricted even if only a thin recording layer is formed on the side surfaces of prepits or an ablation type recording layer is used and through holes are defined to the recording layer by recording because the ultraviolet ray curable resin containing the lipophilic group has repellency so that the deformation of a prepit pattern is reduced or removed.

Further, in the case when an an ultraviolet ray curable resin having permeability to an organic compound forming a recording film underlayer is used, the ultraviolet ray curable resin is exposed at a portion of the surface of the stamper when a preformat pattern is transferred. The curable resin permeates the organic compound of the recording underlayer to cause this exposure to the surface of the stamper during formation of the preformat pattern. Thus, the curable resin forms a bridge or network structure of itself within the organic compound of the underlayer. Since the adhering property of the ultraviolet ray curable resin with the stamper is much lower than the adhering property of the organic compound forming the recording film underlayer with the stamper, the exfoliating force necessary when a replica is exfoliated from the stamper can be made small so that deformation of the preformat pattern and damage of a substrate can be prevented.

Further, when an ultraviolet ray curable resin which does not dissolve an organic compound forming a recording film underlayer is used, since the organic compound is not dissolved by the curable resin, the organic compound is capable of remaining at the surface where the underlayer is in contact with a recording layer. As a result, advantages of the recording film underlayer can be effected in such a manner that a desired recording sensitivity can be maintained even in an optical data recording medium which improves a recording sensitivity by making use of the thermal deformation of the recording film underlayer in such a case as, for example, an ablation type recording layer. Consequently, a preformat pattern which is a cause of generating a dead zone is less deformed so that an optical data recording medium having a high recording capacity can be provided.

As described above, since the optical data recording medium of the present invention comprises a resin layer which is composed of an ultraviolet ray curable resin having a low moisture absorbing property or has a surface covered by a water-impermeable thin film layer, there is avoided the phenomenon that the resin layer is locally swelled to produce a track offset at adjacent tracks, whereby such drawbacks as cross talk and inability of recording and reproducing a preformat pattern can be overcome.

BRIEF DESCRIPTION OF THE DRAWINGS

FIG. 1 through FIG. 6 are diagrams of the first embodiment according to the present invention, wherein:

FIGS. 1 (a)–(d) are process diagrams for manufacturing a recording single plate;

FIGS. 2 (a)–(d) are process diagrams illustrative of a modified example of the recording single plate;

FIG. 3 through FIG. 6 are cross sectional views of the optical disc of the embodiment according to the present invention;

FIGS. 7 and 8 are diagrams of the second embodiment according to the present invention, wherein:

FIG. 7 is a table showing the composition of ultraviolet ray curing resin constituting a resin layer;

FIG. 8 is a graph showing the composition of ultraviolet ray curing resin constituting the resin layer;

FIG. 9 through FIG. 16 are diagrams illustrative of the third embodiment according to the present invention, wherein:

FIG. 9 is a cross sectional view of a main part of the first modified example;

FIG. 10 is a cross sectional view of a recording single plate;

FIGS. 11 through FIG. 14 and FIG. 16 are cross sectional views of main parts of second to fifth modified examples;

FIG. 15 is a graph showing the effect of the third embodiment;

FIG. 18 through FIG. 21 are diagrams explanatory of a prior art, wherein:

FIG. 18 is a plan view of a conventionally known optical disc;

FIG. 19 is an enlarged cross sectional view of a main part of FIG. 18;

FIG. 20 is a cross sectional view of a main part of a photo curing resin layer which is locally swelled; and FIG. 21 is a plan view of a main part explanatory of the problems of the prior art.

DETAILED DISCUSSION

Preferred Embodiments

The first embodiment of the present invention will be described below with reference to FIGS. 1 through 6. The ultraviolet ray curable resin used in the first embodiment is obtained in such a manner that 2-hydroxy-2-methyl-1-phenylpropane-1-on as an optical polymerization initiator is added to the mixture of two or more kinds of organic compounds having the following molecular structural formulas (A)–(J) and the mixture is stirred until it is uniformly mixed.

Molecular structural formula (A)

$$CH_2=\overset{O}{\overset{\|}{C}}COCH(CH_3)CH_2OCN(C_2H_5)\text{–}\text{cyclohexyl}\text{–}CH_2NCO\text{–}CH_2CH(OH)OCC(C_2H_5)(CH_3)=CH_2$$

Molecular structural formula (B)

$$CH_2=\overset{O}{\overset{\|}{C}}COCH(CH_3)CH_2OCN(CH_2CH_3)\text{–}\text{cyclohexyl(CH}_3\text{)}_2\text{–}CH_2NCO\text{–}(CH_2)_{10}OCNCH_2\text{–}\text{cyclohexyl(CH}_3\text{)}_2\text{–}NCOCH_2CH(OH)OCC(CH_3CH_2)(CH_3)=CH_2$$

Molecular structural formula (C)

$$CH_2=CHCOC_2H_4OCN(H)\text{–}\text{toluyl}\text{–}NCOCH_2CH_2(CHCH_2\text{–}C_2H_5)_n CH_2CH_2OCN(H)\text{–}\text{toluyl}\text{–}NCOC_2H_4OCCH=CH_2$$

n = 17 (average value)

Molecular structural formula (D)

$$CH_2=CHCOC_2H_4OCN(H)\text{–}\text{toluyl}\text{–}NCOCH_2CH_2(CHCH_2\text{–}C_2H_5)_n CH_2CH_2OCN(H)\text{–}\text{toluyl}\text{–}NCOC_2H_4OCCH=CH_2$$

n = 50 (average value)

Molecular structural formula (E)

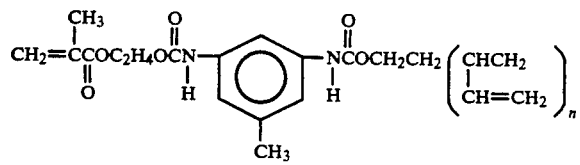

n = 37 (average value)

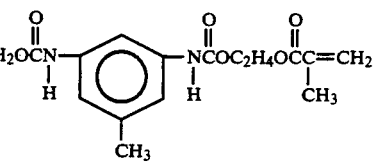

Molecular structural formula (F)

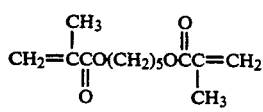

Molecular structural formula (G)

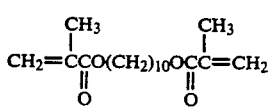

Molecular structural formula (H)

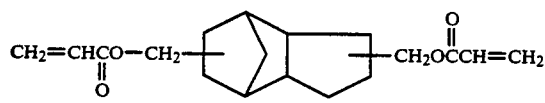

Molecular structural formula (I)

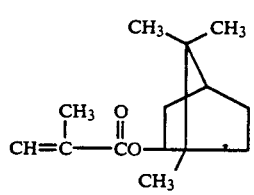

Molecular structural formula (J)

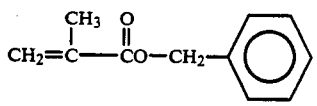

Figure 1A:
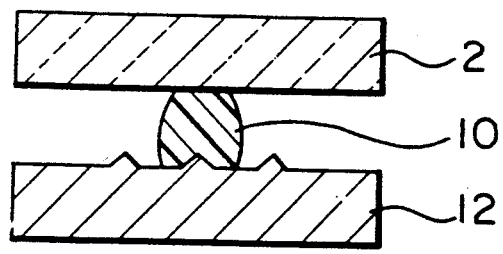

FIGS. 1(a)–(d) are process diagrams explanatory of manufacturing processes of a recording single plate of an optical disc according to the first example. As shown in FIG. 1(a), a nickel stamper 12 having an outside diameter of 300 mm and provided with grooves (depth; 0.09 μm, width; 0.40 μm) and a pit (depth; 0.16 μm, width; 0.60 μm) is prepared. The ultraviolet ray curable resin 10 to be described below is interposed between a transparent substrate 2 composed of a glass disc having an outside diameter of 300 mm and a thickness of 1.2 mm to which a silane-coupling agent (γ-methacryloxy-propyl-trimethoxy-silane) is baked along with the stamper 12, the transparent substrate 2 is pressed to the stamper 1 side to thereby maintain the thickness of the resin layer 10 to about 80 μm.

Figure 1B:
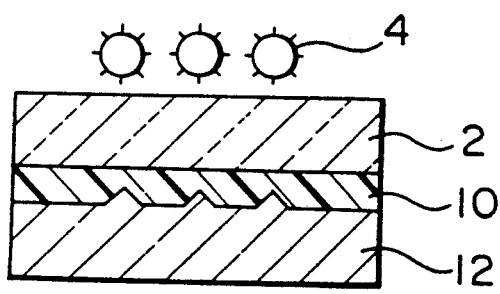

Then, as shown in FIG. 1(b), an energy beam having a light intensity of 150 mw/cm² at a wavelength of 320–400 nm is irradiated from the transparent substrate side 2 for 30 sec using high pressure mercury lamps 4 to cure the above ultraviolet ray curing resin 10 and make it to a transferred layer.

Figure 1C:
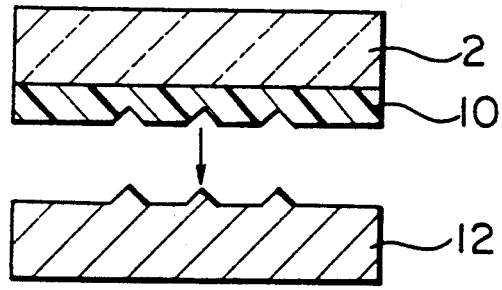
Figure 1D:
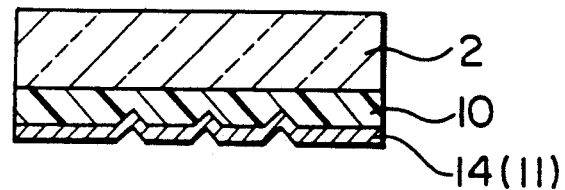
Figure 2A:
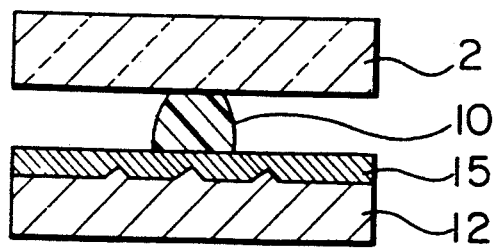
Figure 2B:
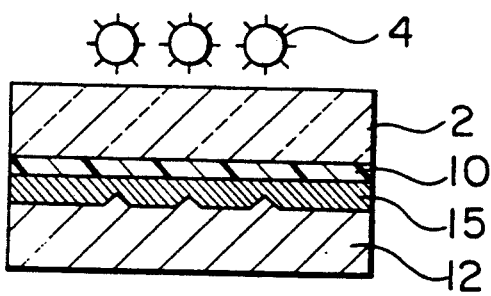
Figure 2C:
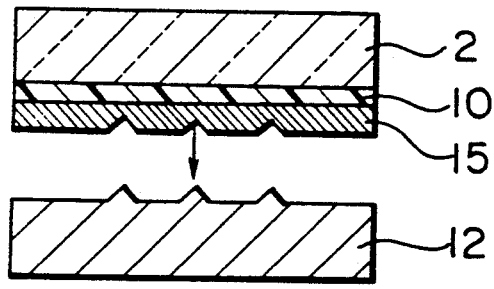
Figure 2D:
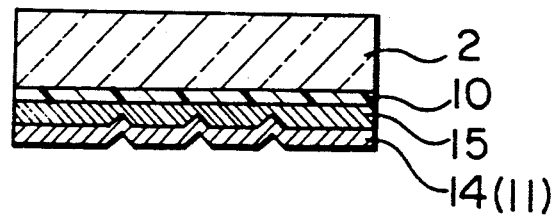

Next, as shown in FIG. 1(c), the stamper 12 is exfoliated from the resin layer 10 (transferred layer) to obtain the transparent substrate 2 provided with a preformat pattern. Thereafter, as shown in FIG. 1(d), a Te-Sn-Pb type recording layer 14 is vacuum deposited on the resin layer 10 to a thickness of 30 nm.

FIG. 2(a)–(d) are diagrams illustrative of a modified example of the recording single plate. This modified example is different from the optical disc shown in FIG. 1 in that an underlayer 15 composed of nitrocellulose, polytetrafluoroethylene (fluorine-contained resin) or the like is interposed between the resin layer 10 and the recording layer 14.

FIGS. 3 to FIG. 6 are cross sectional views of optical discs using these recording single plates.

Figure 3:
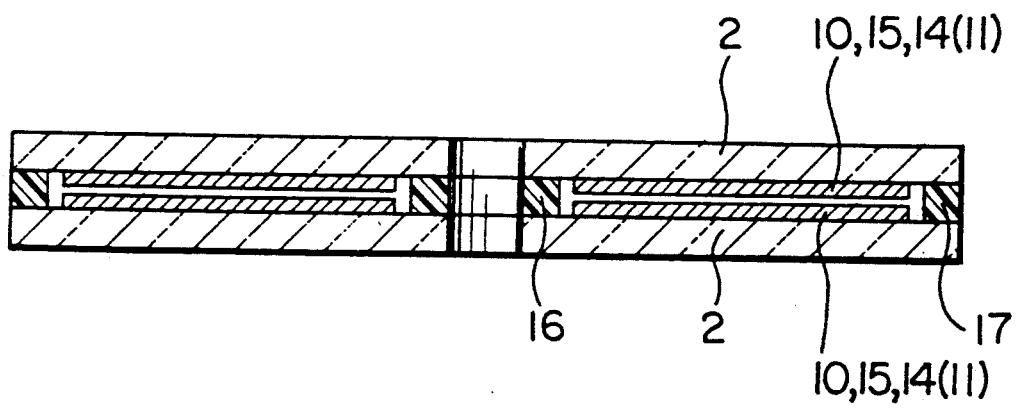

The optical disc shown in FIG. 3 is fabricated to a both side recording type air sandwich structure in which two recording single plates are bonded together through an inner circumferential spacer 16 and an outer circumferential spacer 17, with the recording layer 14 sides of the recording single plates directed inwardly.

Figure 4:
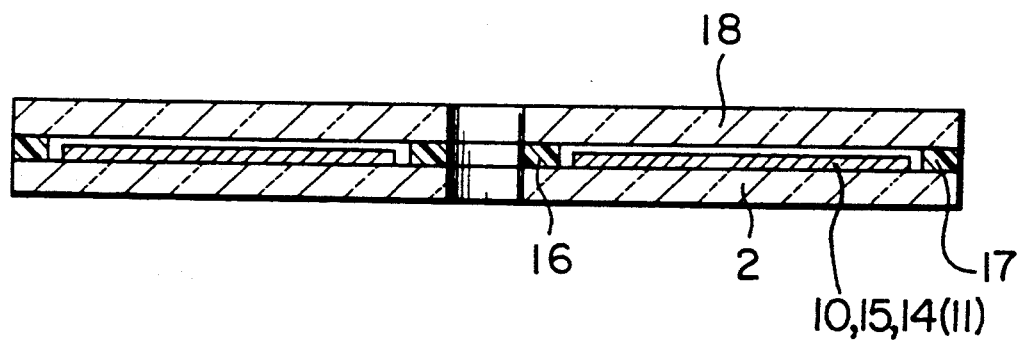

The optical disc shown in FIG. 4 is fabricated to a single side recording type air sandwich structure in which one recording single plate is bonded to one protective plate 18 through an inner circumferential spacer 16 and an outer circumferential spacer 17 in such a manner that a recording layer 14 is directed inwardly.

Figure 5:
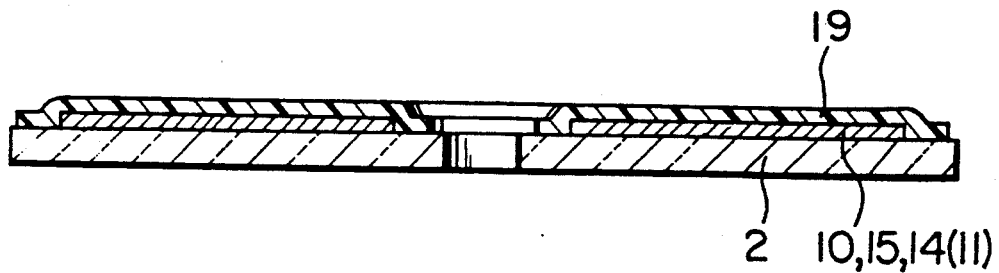

The optical disc shown in FIG. 5 is fabricated to a single plate type structure in which a moisture resistant protective layer 19 is coated on the recording layer 14 of a recording single plate.

Figure 6:
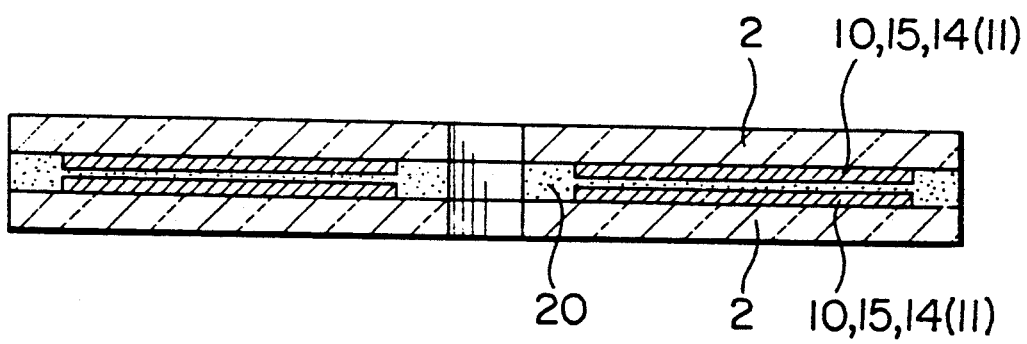

The optical disc shown in FIG. 6 is fabricated to a both side recording type closely bonded structure in which the recording layers 14 of two recording single plates are directly bonded by an adhesive 20.

In addition to the above cases, a recording single plate may be bonded to a protective plate which is not related to the recording of a signal to fabricate a single side recording type optical disc. Further, the optical disc of the air sandwich structure may be fabricated to a sealed type in which an air layer formed between the two recording single plates is cut off from the atmosphere when the fabrication of the optical disc is completed and the optical disc also may be fabricated to a ventilating type in which the air layer is in contact with the atmosphere.

In the structures shown in FIGS. 5 and 6, the recording layers 14 of the optical discs have a sealed structure in which the recording layers 14 are cut off from the atmosphere when the fabrication of the optical discs are completed.

In the above recording single plate, a film thickness d of the recording layer 10 must be restricted to 30–100 μm when it is formed. More specifically, when the film thickness (d) is thinner than 30 μm, a ratio of varying thickness is increased so that the film is bad in flatness with the result that it is not well followed by the beam. On the other hand, when the film thickness d is in excess of 100 μm and too thick, a stress is created when the resin layer 10 is cured and contracted and thus the transparent substrate is warped. Taking the above into consideration, the film thickness d of the resin layer 10 must be restricted to 30–100 μm when it is formed.

Next, Table 1 shows compositions of the ultraviolet ray curing resins used in the respective examples and comparative examples. Note that components A through J in Table 1 represent the above molecular structural formulas and the component K represents the organic compound shown by the following molecular structural formula.

Molecular structural formula (K)

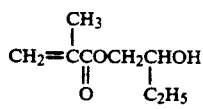

TABLE 1

| | Examples | | | | | | | | | Comparative examples [wt parts] | |
|---|---|---|---|---|---|---|---|---|---|---|---|
| | No. | | | | | | | | | | |
| Compound | 1 | 2 | 3 | 4 | 5 | 6 | 7 | 8 | 9 | 10 | 11 |
| A | 65 | — | — | — | — | — | — | — | 80 | 70 | — |
| B | — | — | — | — | — | 45 | 45 | — | — | — | — |
| C | — | 40 | 40 | — | — | — | — | — | — | — | — |
| D | — | — | — | 40 | 40 | — | — | — | — | — | — |
| E | — | — | — | — | — | — | — | 35 | — | — | 40 |
| F | — | 60 | — | 60 | — | 40 | — | — | — | — | — |
| G | 35 | — | 60 | — | 60 | — | 45 | — | — | — | — |
| H | — | — | — | — | — | — | — | 20 | 20 | 30 | 20 |
| I | — | — | — | — | 15 | — | 45 | — | — | — | — |
| J | — | — | — | — | — | — | 10 | — | — | — | — |
| K | — | — | — | — | — | — | — | — | — | — | 40 |
| * | 2 | 2 | 2 | 2 | 2 | 2 | 2 | 2 | 2 | 2 | 2 |

*Photo polymerization initiator

Next, Table 2 shows the result of the measurement and calculation of a film thickness d of the resin layer 10 when the films of the respective examples and comparative examples are formed, an amount of swelling Δd of the resin layer 10 which is caused when it absorbs moisture during the fabrication thereof (refer to FIG. 6) and a ratio (swelling rate) of the amount of swelling Δd to the film thickness d which is represented by Δd/d.

Note that every optical disc was fabricated at 20° C. and 50% RH.

TABLE 2

| | Examples | | | | | | | | | Comparative Examples | |
|---|---|---|---|---|---|---|---|---|---|---|---|
| | 1 | 2 | 3 | 4 | 5 | 6 | 7 | 8 | 9 | 10 | 11 |
| d (μm) | 40 | 80 | 80 | 70 | 80 | 80 | 60 | 80 | 40 | 50 | 70 |
| Δd (μm) | 0.03 | 0.04 | 0.02 | 0.02 | 0.02 | 0.05 | 0.04 | 0.04 | 0.04 | 0.06 | 0.15 |
| Δd/d (%) | 0.08 | 0.05 | 0.03 | 0.02 | 0.03 | 0.06 | 0.07 | 0.05 | 0.1 | 0.12 | 0.2 |

Table 3 shows tracking noises, cross talks and pit length reading properties of the optical discs obtained by the respective examples and comparative examples. Note that the cross talk in Table 3 with symbol ○ are in the state of not causing error in written data in the disc, those with symbol x are in the state of causing error in written data in the disc, the pit length reading properties with symbol ○ are in the state that a change in the pit length does not cause error in the disc and those with symbol x are in the state that a change in the pit length causes error in the disc.

TABLE 3

| | Examples | | | | | | | | | Comparative Examples | |
|---|---|---|---|---|---|---|---|---|---|---|---|
| No. | 1 | 2 | 3 | 4 | 5 | 6 | 7 | 8 | 9 | 10 | 11 |
| Tracking noise | 20% | 10% | 10% | 10% | 10% | 15% | 15% | 10% | 20% | 30% | 40% |
| Cross talk | ○ | ○ | ○ | ○ | ○ | ○ | ○ | ○ | ○ | ○ | x |
| Reading of pit length | ○ | ○ | ○ | ○ | ○ | ○ | ○ | ○ | ○ | x | x |

As apparent from Table 3, the regulation of the swelling rate of the resin layer (Δd/d) to 0.1% or less, in particular, to 0.05% or less enables the tracking noise to be lowered, whereby the problem of the cross talk and reading error caused by a tracking offset can be solved to improve reliability. Note that although the recording layer 14 was formed as a thin film layer in the above examples, other thin film layer such as, for example, a reflecting layer or the like may be formed.

Figure 8:
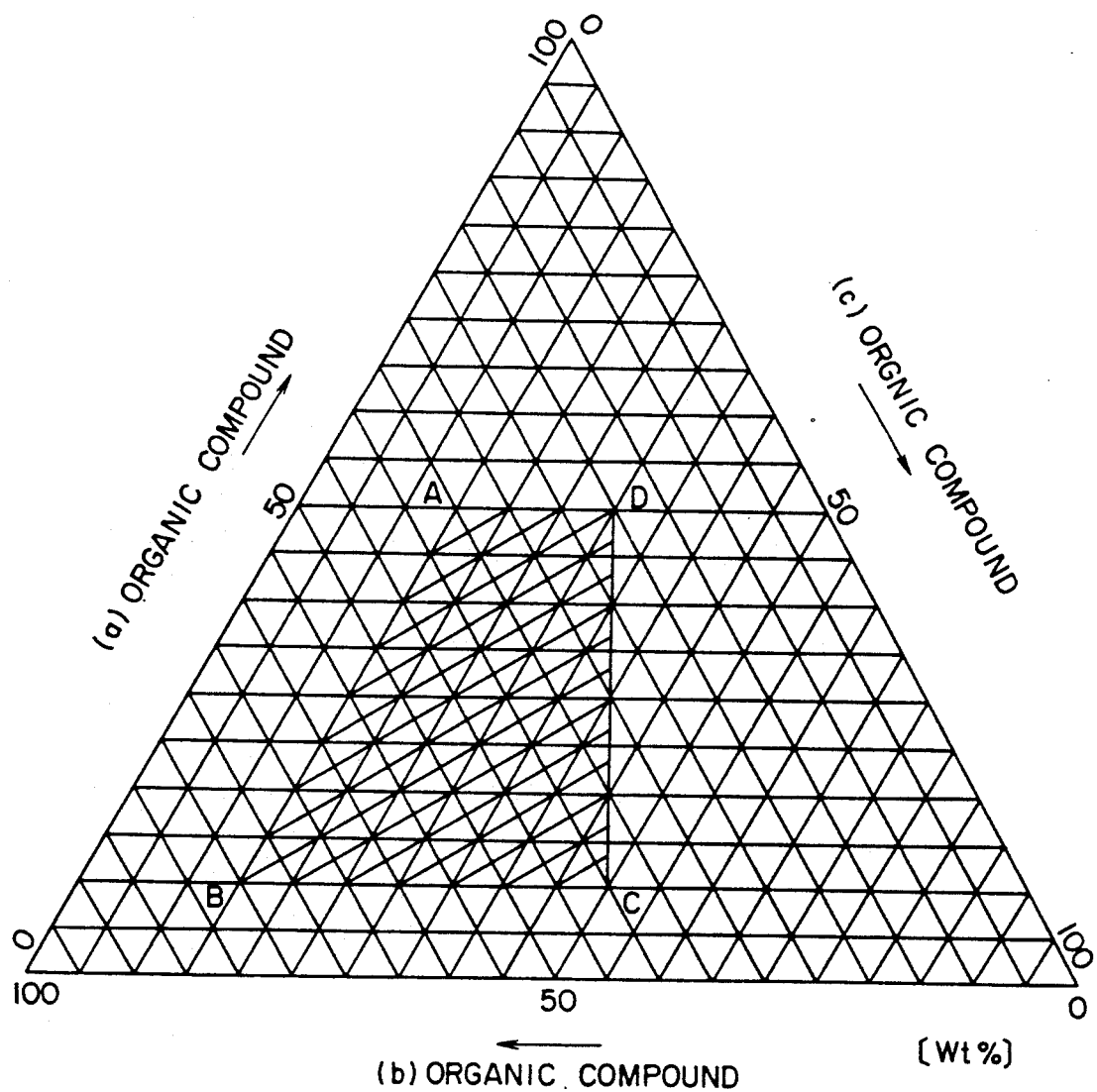

A second embodiment of the present invention will be described below with reference to FIGS. 7 and 8. Note that a method of manufacturing the recording single plate of an optical disc according to the second embodiment is the same as that shown in FIGS. 1 and 2 and thus the method is not illustrated to avoid duplication.

The recording single plate of the optical disc according to the second embodiment is characterized in that the ultraviolet ray curable resin constituting a resin layer 3 is composed of a composition obtained by mixing and curing:

(a) an organic compound having acrylic group or methacrylic group at the end thereof and polybutadiene skeleton or poly-1-butene skeleton at the inner molecule thereof;

(b) an organic compound having one acrylic group or methacrylic group in one molecule thereof and not having such polar group as hydroxy group, carboxylic group, thiol group, amine group, etc. in the molecule;

(c) an organic compound having two or more acrylic groups or methacrylic groups in one molecule and not having such polar group as hydroxy group, carboxylic group, thiol group, amine group, etc. in the molecule; and (d) photo polymerizer.

The compound represented by the following formula (1) or (2) of the above organic compound (a) contains polybutadiene skeleton at the inner molecule.

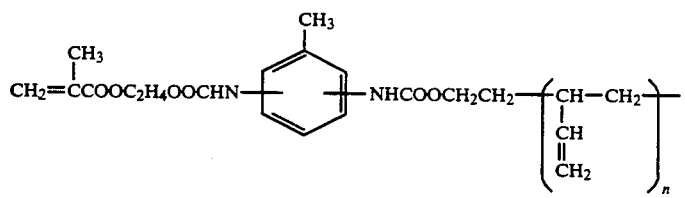

(1)

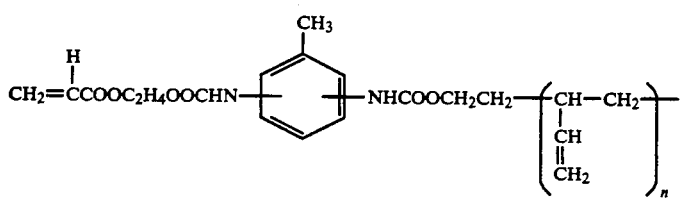

(2)

In addition, the compound represented by the following formula (3) of the above organic compound (a) contains poly-1-butene skeleton at the inner molecule.

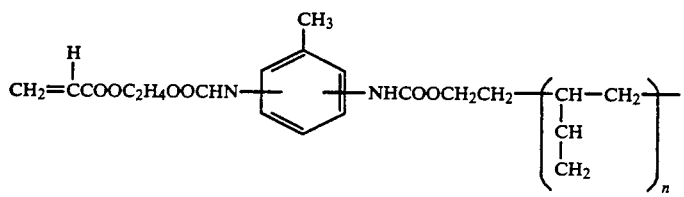

(3)

The above organic compound (a) preferably has an average molecular weight of 500–10000. When the average molecular weight is less than 500, the mechanical strength of the resin layer 10 is lowered, whereas when the average molecular weight exceeds 10000, the viscosity of the light curing composition is increased and thus workability is lowered.

Used as the above organic compound (b) are, for example, methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, t-butyl acrylate, n-butyl methacrylate, isobutyl methacrylate, t-butyl methacrylate, 2-ethyl hexyl acrylate, 2-ethyl hexyl methacrylate, isodecyl acrylate, isodecyl methacrylate, lauryl acrylate, lauryl methacrylate, isobornyl acrylate, isobornyl methacrylate, etc.

Used as the above organic compound (c) are, for example, ethyleneglycol diacrylate, ethyleneglycol dimethacrylate, 1,3-butanediol diacrylate, 1,3-butanediol dimethacrylate, 1,4-butanediol diacrylate, 1,4-butanediol dimethacrylate, neopentyl glycol diacrylate, neopentyl glycol dimethacrylate, neopentyl glycol diacrylate, 1,6-hexanediol diacrylate, 1,6-hexanediol dimethacrylate, 1,10-decanediol diacrylate, 1,10-decanediol dimethacrylate, tripropyrene glycol diacrylate, tripropyrene glycol dimethacrylate, etc.

Although a photo polymerizer as the above organic compound (d) is not limited so long as it produces radicals by the irradiation of light and radically polymerizes acryl group or methacryl group, for example, benzyl, benzoine, thioxanthone, anthraquinone, benzylketar, 1-hydroxy cyclohexyl phenylketone are effective.

Nitrocellulose having a nitrogen ratio of 11.9–12.2%, an average degree of substitution of about 2.1–2.3 and viscosity of 850–1000 (sec) at a solid ratio of 12.2% (product of Asahi Kasei Co., Ltd., brand name: HI-1000) is suitable as the nitrocellulose used in the above underlayer 15.

FIG. 7 shows specific components of the composition (wt parts) forming the recording film underlayer 6. Note that the compounds 1–9 in FIG. 7 are the following compounds.

Compound 1

The compound 1 is poly-1,2-butadiene containing methacryl radicals in both end (average molecular weight: 2000, product of Nippon Soda Co., Ltd., brand name: TE-2000).

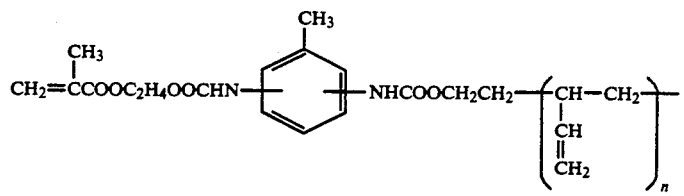

Compound 2

The compound is poly-1-butene containing acryl radicals in both end (average molecular weight: 1000, product of Nippon Soda Co., Ltd., brand name: TEAI-1000).

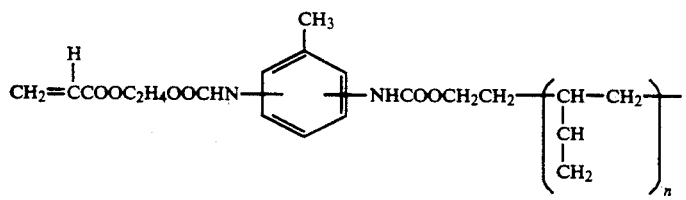

Compound 3

The compound 3 is poly-1-butene containing acryl radicals in both end (average molecular weight: 3000, product of Nippon Soda Co., Ltd., brand name: TEAI-3000).

It has the same molecular structural formula as the above compound 3.

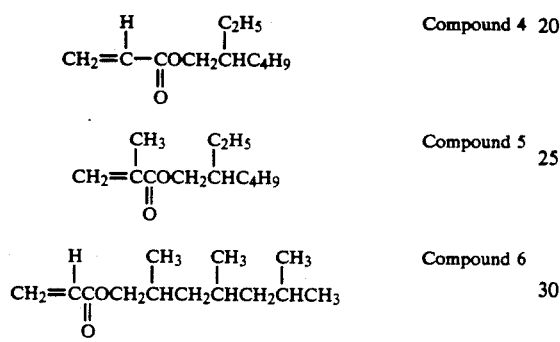

The following various tests were carried out to the examples 1-14 shown in FIG. 7 and Table 4 shows the results of the tests.

(Test item)

Test 1; A water absorbing rate of the recording film underlayer after it is immersed in water at 20° C. for 7 days. [unit: %]

Test 2: A tracking noise after the vapor deposited recording layer is aged in a ventilating state in an environment of 20° C. and 50% RH. [unit %]

Test 3: A cross hatch closely bonding force test of the substrate with the recording film underlayer. This test was carried out in such a manner that the recording film underlayer was formed on the substrate, each 11 of slits arriving at the substrate was defined to the recording film underlayer at right angles at intervals of 1 m to form 100 pieces of independent square portions, the square portions were exfoliated 3 times using an adhesive tape and then the number of the remaining square portions were counted. [Refer to JIS K5400, unit: piece]

Test 4: An exfoliating property from a stamper test.

Test 5: A test of a transferring property of a pattern from the stamper.

Test 6: A test of workability in the processes for forming a recording film underlayer.

Note that symbol ⊙ shows the test result was judged to be in a very good state and symbol ◯ shows the test result was judged to be in a good state in Tests 4-6.

TABLE 4

| Test | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 1 | 0.3 | 0.3 | 0.3 | 0.3 | 0.3 | 0.3 | 0.3 | 0.3 | 0.3 | 0.3 | 0.3 | 0.3 | 0.3 | 0.3 |
| 2 | <10% | <10% | <10% | <10% | <10% | <10% | <10% | <10% | <10% | <10% | <10% | <10% | <10% | <10% |
| 3 | 100 | 100 | 100 | 100 | 100 | 100 | 100 | 100 | 100 | 100 | 100 | 100 | 100 | 100 |
| 4 | ⊙ | ⊙ | ⊙ | ⊙ | ⊙ | ⊙ | ⊙ | ⊙ | ⊙ | ⊙ | ⊙ | ⊙ | ⊙ | ⊙ |
| 5 | ⊙ | ⊙ | ⊙ | ⊙ | ⊙ | ⊙ | ⊙ | ⊙ | ⊙ | ⊙ | ⊙ | ⊙ | ⊙ | ⊙ |
| 6 | ⊙ | ⊙ | ⊙ | ⊙ | ⊙ | ⊙ | ⊙ | ⊙ | ⊙ | ⊙ | ⊙ | ◯ | ◯ | ⊙ |

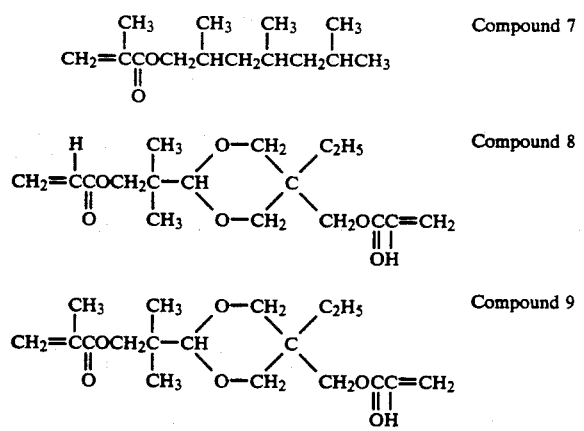

As shown in FIG. 2 (d), in the case of the optical data recording medium comprising the resin layer 10 composed of ultraviolet ray curing resin and the underlayer 15 composed of nitrocellulose, a material which is not substantially compatible with the nitrocellulose is preferably selected as the composition constituting the resin layer 10. In this specification, the material which is not substantially compatible with the nitrocellulose means a material which is not compatible with the nitrocellulose at all and a material which is a little compatible with it but does not affect a reflection factor.

The inventors have made various studies regarding a composition which is not substantially compatible with the nitrocellulose with the result that the organic compound (a) represented by the above molecular structural formulas and the organic compound (b) represented by the following molecular structural formulas can be used.

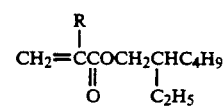

-continued

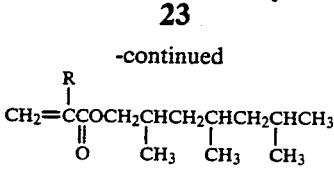

Further, the organic compound (c) represented by the following molecular structural formula can be used.

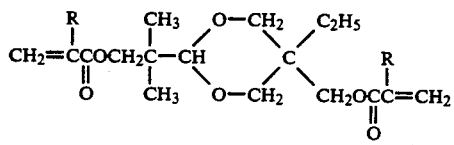

Note that R represents H or CH3 in these molecular structural formulas.

Next, as the result of a study of a component ratio of the respective organic compounds, it is found that the component ratios within the area of the oblique lines surrounded by the linear lines connecting points A, B, C and D are preferable. Table 5 shows the component ratios of the respective organic compounds (a), (b) and (c) at the points A, B, C and D.

TABLE 5

|  | | | [unit: wt %] |
|---|---|---|---|
| Point | Organic compound (a) | Organic compound (b) | Organic compound (c) |
| A | 50 | 35 | 15 |
| B | 10 | 75 | 15 |
| C | 10 | 40 | 50 |
| D | 50 | 20 | 30 |

When the above organic compounds (a), (b) and (c) are used and mixed in a component ratio within the area of the oblique lines surrounded by the linear lines connecting the points A, B, C and D, they do not affect an underlayer composed of nitrocellulose. An average reflection factor is 40% in the state that a recording layer is formed, and in the case of an optical disc provided with a recording film underlayer having the composition mixed in a component ratio within the area of the oblique lines surrounded by the linear lines connecting the above points A, B, C and D, a measured range of dispersion of a reflection factor was about 38–42%, whereas in the case of an optical disc provided with a recording film underlayer having the composition mixed in a component ratio outside the area of the oblique lines, measured range of the reflection factor was dispersed in a wider range of about 30–42% even if the same organic compounds (a), (b) and (c) were used.

Table 6 shows conventionally known compositions of a recording film underlayer. The compounds in Table 6 are as follows.

Compound 8

The same material as Compound 8 shown in the above examples.

Compound 10

Polycarbonate diacrylate (product of Nippon Polyurethane Co., Ltd., brand name: DN-981, molecular weight: 1000).

Compound 11

Polyurethane diacrylate (product of Sumitomo Bayer, brand name: DDD 2020E, molecular weight 2000).

TABLE 6

| | | | [Unit: wt parts] |
|---|---|---|---|
| | Comparative Examples | | |
| | 1 | 2 | 3 |
| Compound 8 | 100 | 70 | 90 |
| Compound 10 | 0 | 30 | 0 |
| Compound 11 | 0 | 0 | 10 |
| Photopolymerizer | 3 | 3 | 3 |

Table 7 shows the result of various tests for the respective specimens (Comparative Examples 1–3). The conditions for the tests are the same as those described in the above examples.

TABLE 7

| | Comparative Examples | | |
|---|---|---|---|
| Test | 1 | 2 | 3 |
| 1 | 0.3 | 0.7 | 0.4 |
| 2 | — | — | — |
| 3 | 0 | 0 | 0 |
| 4 | ⊚ | ⊚ | ⊚ |
| 5 | ⊚ | ⊚ | ⊚ |
| 6 | ⊚ | ⊚ | ⊚ |

As apparent from Table 7, although relatively good results were obtained with respect to Test 4 (an exfoliation test), Test 5 (a pattern transfer test) and Test 6 (workability), a closely bonding property to a transparent substrate (a glass plate) was bad and a tracking noise could not be measured because a recording film underlayer was exfoliated from the substrate during the vapor deposition of a recording layer.

On the other hand, since the examples of the present invention has a good closely bonding property with a substrate to prevent a recording film underlayer from being exfoliated from the substrate and further the recording film underlayer has a small water absorption, a smaller amount of tracking noise is produced, a surface condition is flat at any tracks and thus even the part of track which is close to a block borderline can be used, the reduction in a recording capacity is prevented, and the advantages of a CLV system, an MCAV system and a MCLV system can be sufficiently effected, whereby a reliable optical data recording medium can be obtained.

Various kinds of optical discs shown in FIG. 3 through 6 can be fabricated from the recording single plate of this embodiment.

The third embodiment of the present invention will be described below with reference to FIG. 9 through FIG. 16.

Figure 9:
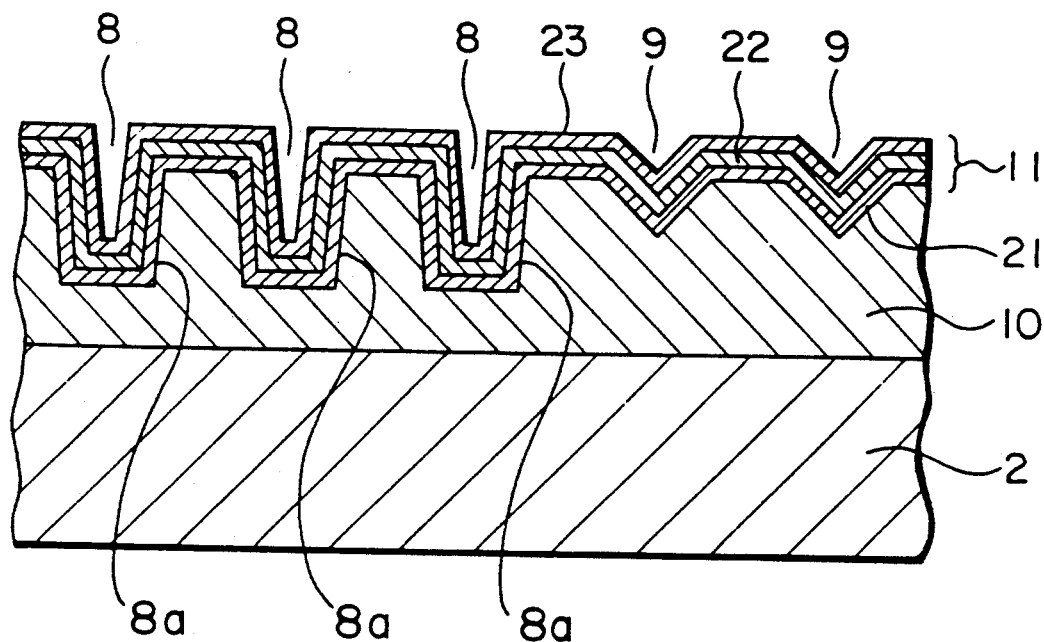

FIG. 9 is a cross sectional view illustrative of the first modified example of a recording single plate according to the third embodiment, wherein 2 designates a transparent substrate, 10 designates a resin layer, 8 designates prepits, 9 designates guide grooves (pregrooves), and 11 designates a thin film layer.

The thin film layer 11 of this modified example has a three layer structure comprising a water impermeable film 21 composed of dielectrics, an underlayer film 22 for improving recording sensitivity and a write once type recording film 23.

A substance selected from oxide, nitride, sulfide or fluoride of metal or metalloid, such as, for example, SiO, $SiO_2$, $Al_2O_3$, $Si_3N_4$, AlN, ZnS, $MgF_2$ can be used as the dielectrics forming the above water-impermeable film 21.

When the recording film employs an ablation system, a substance which effects fusion, degradation and sublimation at a temperature lower than that of the recording film such as, for example, a polytetrafluoroethylene can be used as the above underlayer film 22.

A recording film of a tellurinic ablation system or a recording film making use of bubble formation, for example, can be used as the above recording film 23.

Figure 10:
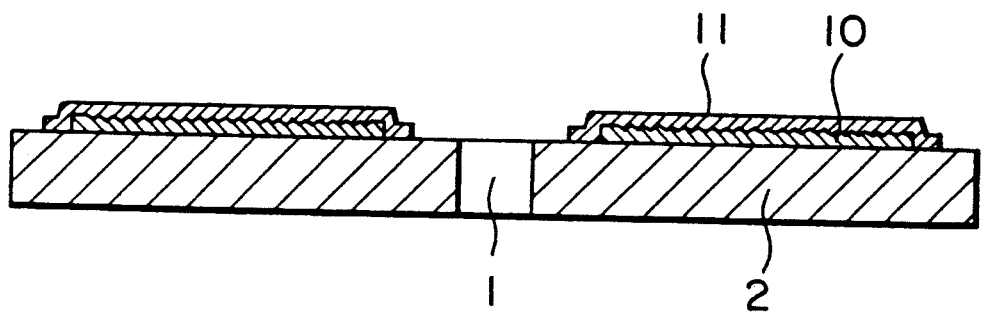

As shown in FIGS. 9 and 10, the respective films 21, 22, and 23 are formed to a substantially uniform thickness over the overall front surface of the above resin layer 10 including a side wall 8a of the prepit 8 and the overall surface of the region ranging from the edge of the transferred layer 10 to a portion of the substrate adjacent to the edge. The above water-permeable film 21 and recording film 23 having water-impermeable of the respective films are formed to a thickness capable of cutting off water in air and, for example, the water-impermeable film 21 is formed to a thickness of 300 angstrom or more.

The following means can be employed for forming the thin film 11 having a uniform thickness as shown in FIG. 9: (1) means of sputtering respective thin film layer materials in a vacuum vessel having a gaseous pressure adjusted to a high pressure of $5 \times 10^{-1}$ Pa or more; (2) means of vacuum depositing of the respective thin film layer materials while changing a set angle of the said transferred surface to the deposition source as time passes; (3) means of using a plasma CVD method as a film forming method in vacuum and the like.

Note that the optical data recording medium of the first modified example is applicable to an optical disc having any arbitrary preformat system such as the MCAV system, MCLV system, CAV system CLV system and the like. Further, it is also applicable to an optical data recording medium having any arbitrary shape such as an optical card.

Since the optical data recording medium of the above first modified example completely covers the surface having a moisture absorbing property on which a signal pattern is transferred by the three films including the water-impermeable film 21 having water-impermeability and the recording film 23, there is avoided the phenomenon that water in air enters from the side of the prepit to cause the resin layer to be locally swelled so that track effects are produced in tracks next thereto and such drawbacks as a cross talk and inability of recording and reproducing a signal can be overcome.

Note that it is not always necessary to form the underlayer film 22 out of the above three films 21, 22 and 23 to a uniform thickness over the overall front surface of the above transferred layer, and thus when the total thickness of the films having water-impermeability is greater than a predetermined value, the same effect as that of the above first modified example can be obtained even if the side wall 8a portion of the prepit 8 is formed to a thinner thickness.

Next, the second modified example of this embodiment will be described with reference to FIG. 11. The optical data recording medium of the second modified example omits the water-impermeable film 21 of the optical data recording medium of the first modified example and the same numerals as used in FIG. 1 are used in FIG. 11 to designate portions corresponding to those in FIG. 1.

Figure 11:
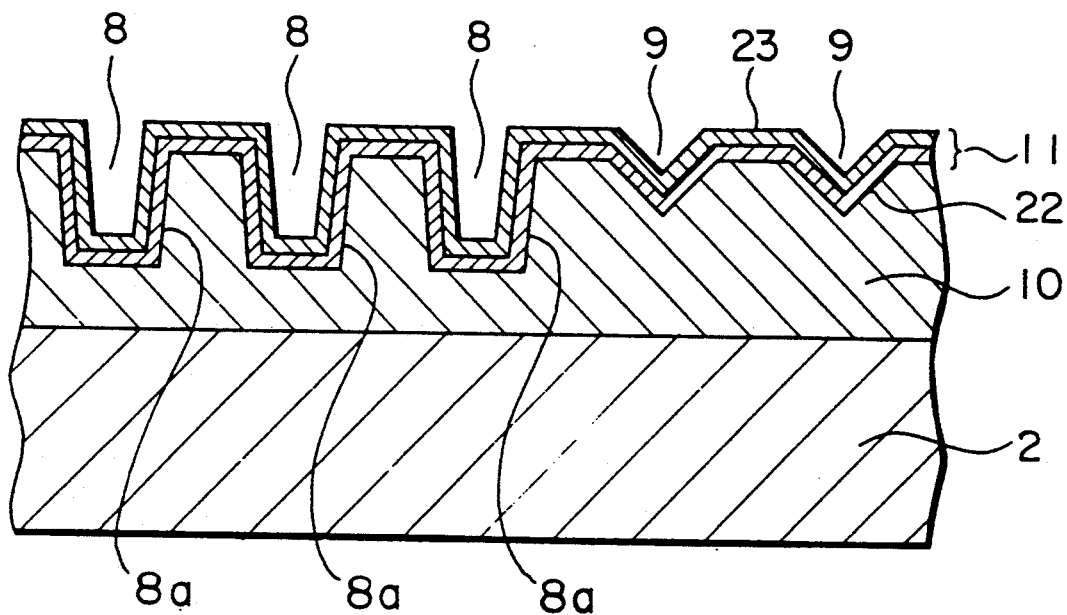

As shown in FIG. 11, the thin film layer 11 of this modified example has a two layer structure comprising an underlayer film 22 for improving recording sensitivity and a write once type recording film 23 sequentially layered from a resin layer 10 side. The respective films 22 and 23 are formed to a substantially uniform thickness over the overall front surface of the resin layer 10 including a side wall 8a of a prepit 8 and the overall surface of the region ranging from the edge of the resin layer 10 to a portion of the substrate adjacent to the edge of the resin layer (refer to FIG. 10).

A material, configuration and size of the respective portions constituting this optical data recording medium, a method of transferring a preformat pattern, a film thickness of the respective thin films and a method of forming these respective films are the same as those of the optical data recording medium shown in FIG. 9.

The second modified example is applicable to an optical data recording medium such as, for example, an optical data recording medium of a sealed type air sandwich structure subjected to a perfect dehydrating treatment wherein water permeation from a recording pit is not a considerable problem but water permeation from the prepit 8 is a problem.

Note that it is not always necessary to form the underlayer film 22 having water-permeability out of the above two thin films 22 and 23 to a uniform thickness over the overall front surface of the above resin layer 10 and the same effect as that of the above first embodiment can be obtained even if the side 8a portion of the prepit 8 is formed to a thinner thickness.

Next, the third modified example of this embodiment will be described with reference to FIG. 12, wherein 25 designates an enhanced film, 26 designates a magneto-optical recording film and the same numerals as used in FIG. 1 are used to designate portions corresponding to those in FIG. 1.

Figure 12:
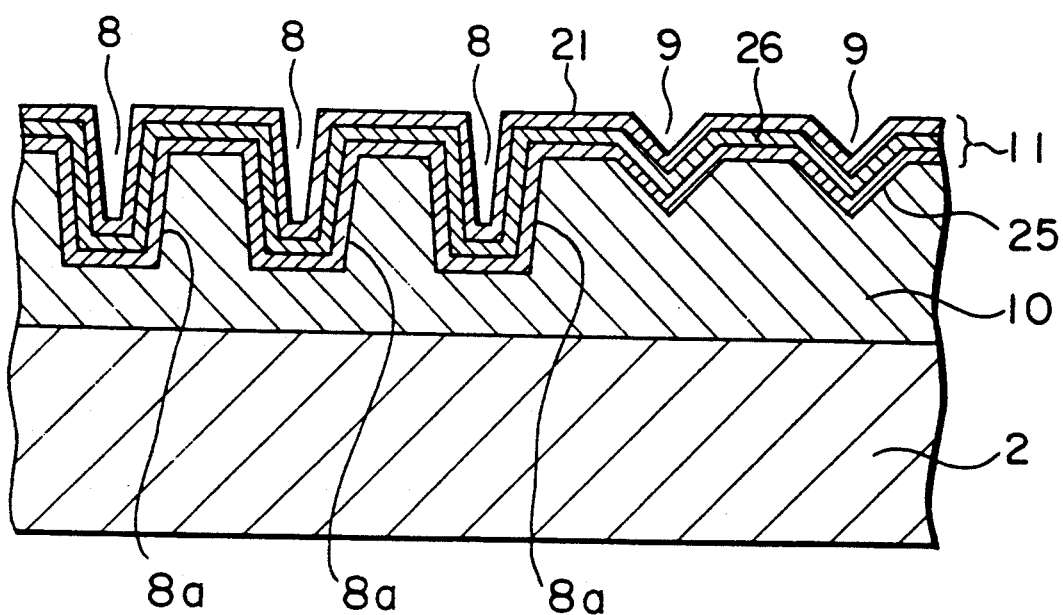

A shown in FIG. 12, the thin film layer 11 of this modified example has a three layer structure comprising the enhanced film 25 having a refraction factor of light higher than that of a substrate 2, the magneto-optical recording film 26 and a water-impermeable film 21 composed of dielectrics having the substantially same refraction factor of light as that of the substrate 2 sequentially layered from a resin layer 10 side.

A substance such as, for example, SiO, $Al_2O_3$, $Si_3N_4$, AlN, ZnS or the like which forms the water-impermeable film 21 can be used as the dielectrics for forming the above enhanced film 25. This enhanced film 25 is formed to a thickness of $\lambda/4 n$, where wavelength of reproducing light is represented by $\lambda$ and a refraction factor of light of the enhanced film 25 is represented by n.

A known material such as, for example, amorphous alloy of transition metal and rare earth metal represented by terbium-iron-cobalt alloy can be used for the magneto-optical recording film 26.

As shown in FIG. 12, the respective films 25, 26 and 21 are formed to a substantially uniform thickness over the overall front surface of the resin layer 10 including a side wall 8a of a prepit 8 and the overall surface of the region ranging from the edge of the resin layer 10 to a portion of the substrate adjacent to the edge of the resin layer (refer to FIG. 10).

A material, configuration and size of the respective portions consisting this optical data recording medium, a method of transferring a preformat pattern, a film thickness of the respective thin films and a method of forming the respective thin films are the same as those of the optical data recording medium shown in FIG. 9.

Since the optical data recording medium of this modified example does not have holes created in the magneto-optical recording film 26, water permeation from a recording pit (a magnetized domain) does not matter. Water permeation from the prepit 8 has the same effect as that of the optical data recording medium of the above first modified example.

All of the above thin films 25, 26 and 21 have water-impermeable. Therefore, it is not always necessary to form all the thin films to a uniform thickness over the overall surface of the resin layer 10 as in the above third modified example, and when at least one of these films is formed uniformly or the total thickness of the films having water-impermeable is greater than a predetermined value, the same effect as that of the above first modified example can be obtained.

Next, the fourth modified example of the embodiment will be described with reference to FIG. 13, wherein 25 designates an enhanced film, 26 designates a magneto-optical recording film, 27 designates a protective film having an enhancing function, 28 designates a reflecting film and the same numerals as used in FIG. 9 are used to designate portions corresponding to those in FIG. 9.

Figure 13:
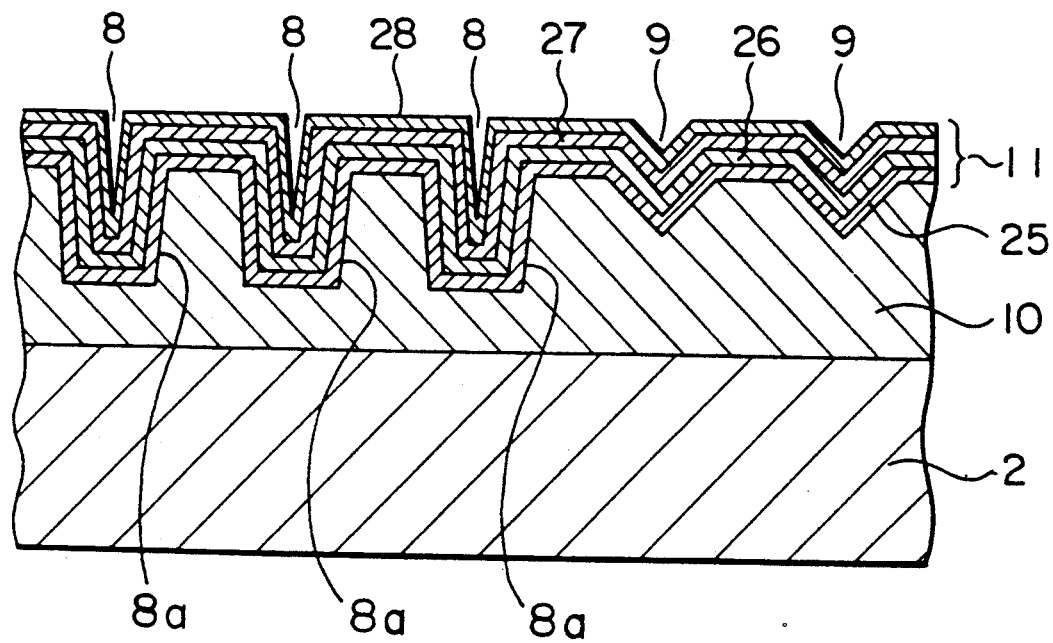

As shown in FIG. 13, the thin film layer 11 of this modified example has a four layer structure comprising the enhanced film 25 composed of dielectrics having a refraction factor of light higher than that of a substrate 2, the magneto-optical recording film 26, the protective film composed of dielectrics having the enhancing function and the reflecting film 28 sequentially layered from a resin layer 10 side.

A substance such as, for example, SiO, $Al_2O_3$, $Si_3N_4$, AlN, ZnS or the like which forms the enhanced film 25 can be used as the dielectrics for forming the above protective film 27. This protective film 27 is formed to a thickness of $\lambda/4$ n, where a wavelength of reproducing light is represented by $\lambda$ and a refraction factor of light of the protective film 27 is represented by n.

A metal film composed of such as, for example, aluminum can be used as the reflecting film 28.

As shown in FIG. 13, the respective films 25 through 28 are formed to a substantially uniform thickness over the overall front surface of the resin layer 10 including a side wall 8a of a prepit 8 and the overall surface of the region ranging from the edge of the resin layer 10 to a portion of the substrate 2 adjacent to the edge of the resin layer (refer to FIG. 10).

A material, configuration and size of the respective portions constituting this optical data recording medium, a method of transferring a preformat pattern, a film thickness of the respective thin films and a method of forming the respective thin films are the same as those of the optical data recording medium shown in FIGS. 9 and 11.

The optical data recording medium of this modified example is characterized in that it has not only the same advantages as that of the above first modified example but also has increased reproducing sensitivity since the optical data recording medium is provided with the double films having the enhancing function.

All of the above four thin films 25 through 28 have water-impermeable. Therefore, it is not always necessary to form all the thin films to a uniform thickness over the overall surface of the resin layer 10 as in the above fourth modified example, and when at least one of these films is formed uniformly or the total thickness of the films having water-impermeability is greater than a predetermined value, the same effect as that of the above first modified example can be obtained.

Next, the fifth modified example of this embodiment will be described with reference to FIG. 14, wherein 29 designates a water-permeable recording film or reflecting film and the same numerals are used to designate portions corresponding to those in FIG. 9.

Figure 14:
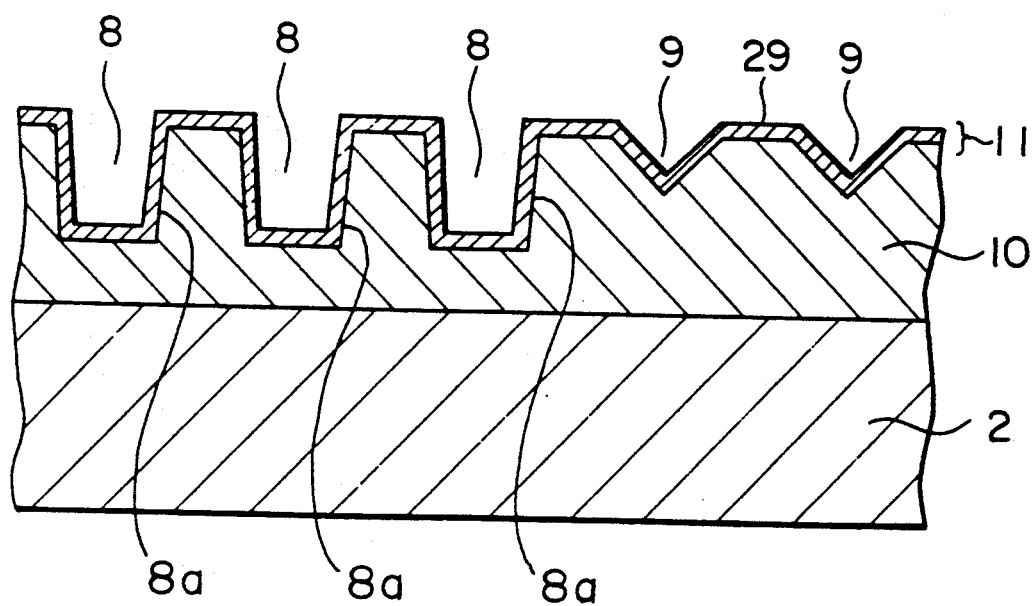

As shown in FIG. 14, a thin film 11 comprises one layer of the water-permeable recording film or reflecting film 29. This recording film or reflecting film is formed to a substantially uniform thickness over the overall front surface of a resin layer 10 including a side wall 8a of a prepit 8 and the overall surface of the region ranging from the edge of the resin layer 10 to a portion of a substrate 2 adjacent to the edge of the rosin layer.

Almost all recording films except an organic dye type recording film can be used as the water-impermeable recording film. Further, a metal film such as an aluminum film can be used as the water-impermeable reflecting film.

A material, configuration and size of the respective portions constituting this optical data recording medium, a method of transferring a preformat pattern, a format of the preformat pattern, a film thickness of the respective thin films and a method of forming the respective thin films are the same as those of the optical data recording medium shown in FIG. 9.

The optical data recording medium of the fifth modified example has substantially the same advantages as that of the optical data recording medium of the first embodiment.

The advantages of the present invention will be described below with reference to specific experimental examples of the invention.

Experimental Examples

An optical recording single plate of the structure shown in FIG. 9 was formed in such a manner that a photo curing resin layer on which an MCAV format or MCLV format was preformated was formed on one side of a glass substrate by so-called 2P method and an water-impermeable film composed of $Si_3N_4$, an underlayer film composed of polytetrafluoroethylene and a tellurium-selenium-lead type recording film were succeedingly laminated on the surface of the photo curing resin layer on which a preformat pattern was transferred.

The water-impermeable film composed of $Si_3N_4$ was formed to a film thickness of about 400 angstrom using $Si_3N_4$ as a target on which a high frequency power of 300 W was imposed and using a pure argon gas as a sputtering gas after a sputtering gaseous pressure in a vacuum chamber was adjusted to $7 \times 10^{-1}$ Pa.

The underlayer film composed of polytetrafluoroethylene was formed to a film thickness of about 400 angstrom using polytetrafluoroethylene as a target on which a high frequency power of 80 W was imposed and using a pure argon gas as a sputtering gas after a sputtering gaseous pressure in a vacuum chamber was adjusted to $8 \times 10^{-1}$ Pa.

The tellurium-selenium-lead type recording film was formed to a film thickness of about 210 angstrom using tellurium-selenium-lead as a target on which a high frequency power of 80 W was imposed and using a pure argon gas as a sputtering gas after a sputtering gaseous pressure in a vacuum chamber was adjusted to $5 \times 10^{-1}$ Pa.

After the recording film was formed, the above recording single plate was baked (80° C.×1 hour) to microcrystalline the recording film.

After the completion of the baking treatment, two recording single plates produced as described above were bonded together through an inner circumferential metal spacer 16 and an outer circumferential spacer 17 to produce an optical disc recording medium of a sealed type air sandwich structure as shown in FIG. 3. Note that epoxy resin having a small water permeability was used as an adhesive for bonding the recording single plates with the inner and outer circumferential spacers 16 and 17.

Comparative Example

An optical data recording medium without a water-impermeable film composed of silicon nitride was produced under quite the same conditions as above.

Figure 15:
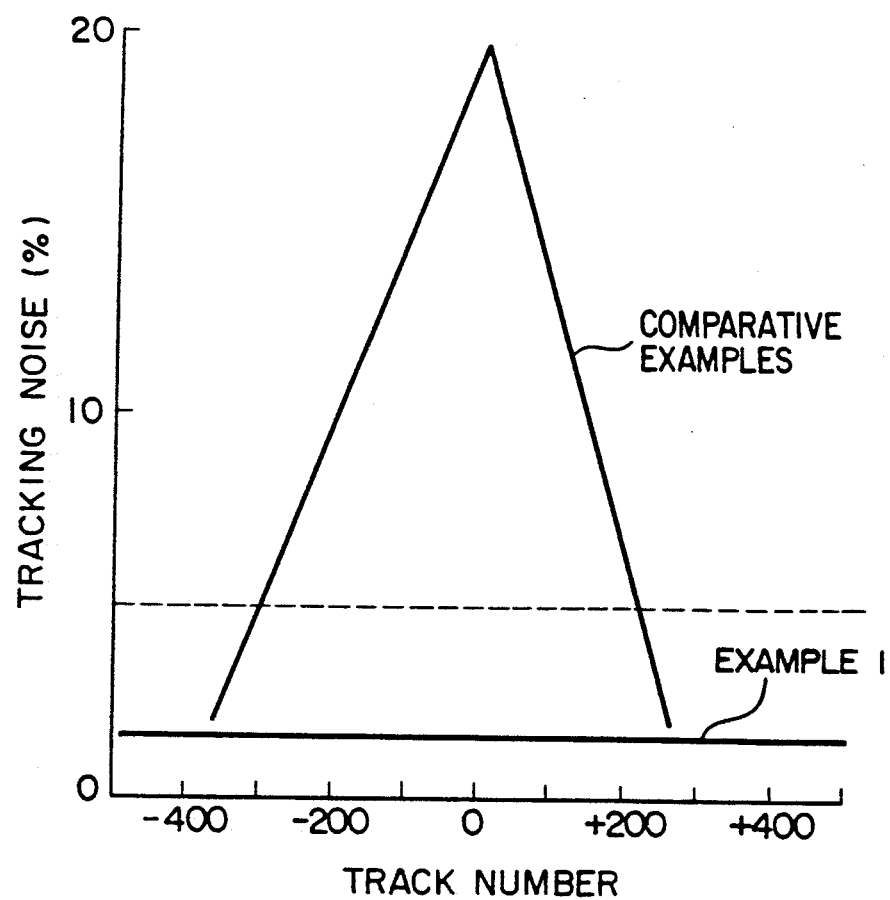

FIG. 15 shows the advantages of the present invention.

The horizontal axis of this graph shows the number of recording tracks disposed at 1.6 μm pitches on the inner and outer circumferential sides about a prepit-formed portion and the vertical axis thereof shows a magnitude of a noise caused by the swelling of the prepit (unit: %) to an amplitude of a tracking noise, i.e., a trucking jump signal. An allowable level of the tracking noise is shown by a dotted line.

As apparent from the graph, it is found that the optical data recording medium according to the comparative example has 300 tracks on the inner circumferential side and 215 tracks on the outer circumferential side about the prepit-formed portion 0 which exceed the allowable track noise level and thus this region is a dead zone. On the other hand, it is found that the optical data recording medium according to the present invention has no region which exceed the allowable track noise level and thus no dead zone is formed regardless of the presence of the prepit.

The same result was also obtained for the above second through fourth modified examples.

Although the above respective modified examples are described with reference to the optical disc as an example, the gist of the present invention is not limited to it and applicable to any arbitrary known optical data recording medium such as an optical card to which, for example, parallel guide grooves are linearly defined.

Figure 16:
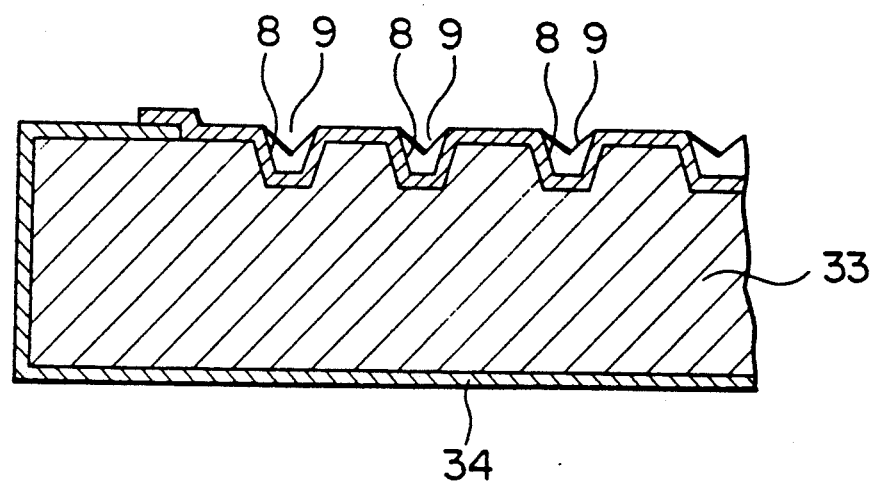

Further, the above respective examples are described with reference to the optical data recording medium wherein the photo curing resin layer is formed on the one side of the glass substrate, the gist of the present invention is not limited to it and applicable to an optical data recording medium likewise in which a substrate 33 having prepits 8 and guide grooves 9 is composed of water permeable resin and the overall surface of the substrate 33 is subjected to a water-impermeable treatment except the preformat pattern surface thereof, as shown in FIG. 16.

Further, although the transferred layer of the preformat pattern is formed of a single layer composed of the resin layer 3 and the thin film layer 18 such as the underlayer or the like is formed on the surface of the resin layer 3, the application of the manufacturing method shown in FIG. 2 (a) to (d) enables the transferred layer of the preformat pattern to be composed of the two layers of the resin layer 10 and the underlayer 15 and another thin film to be formed on the surface of the underlayer.

The various kinds of optical discs shown in FIGS. 3 to 6 can be of course fabricated from the recording single plate of this example.

The fourth embodiment of the optical data recording medium according to the present invention will be described below with reference to FIG. 17.

Figure 17:
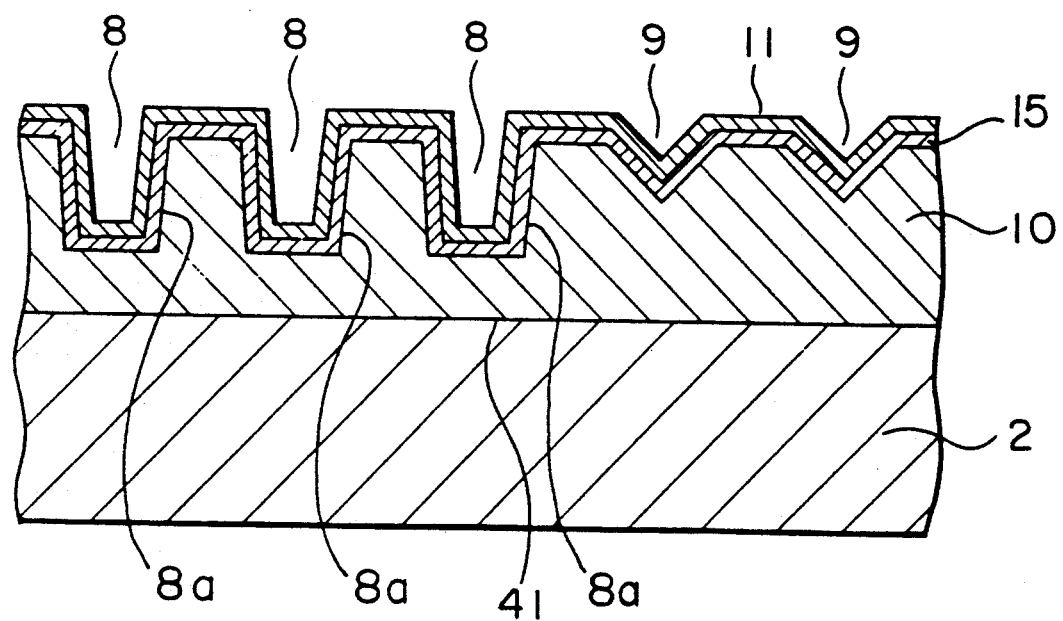
FIG. 17 is a cross sectional view of a main part of a recording single plate according to the fourth embodiment.
Figure 18:
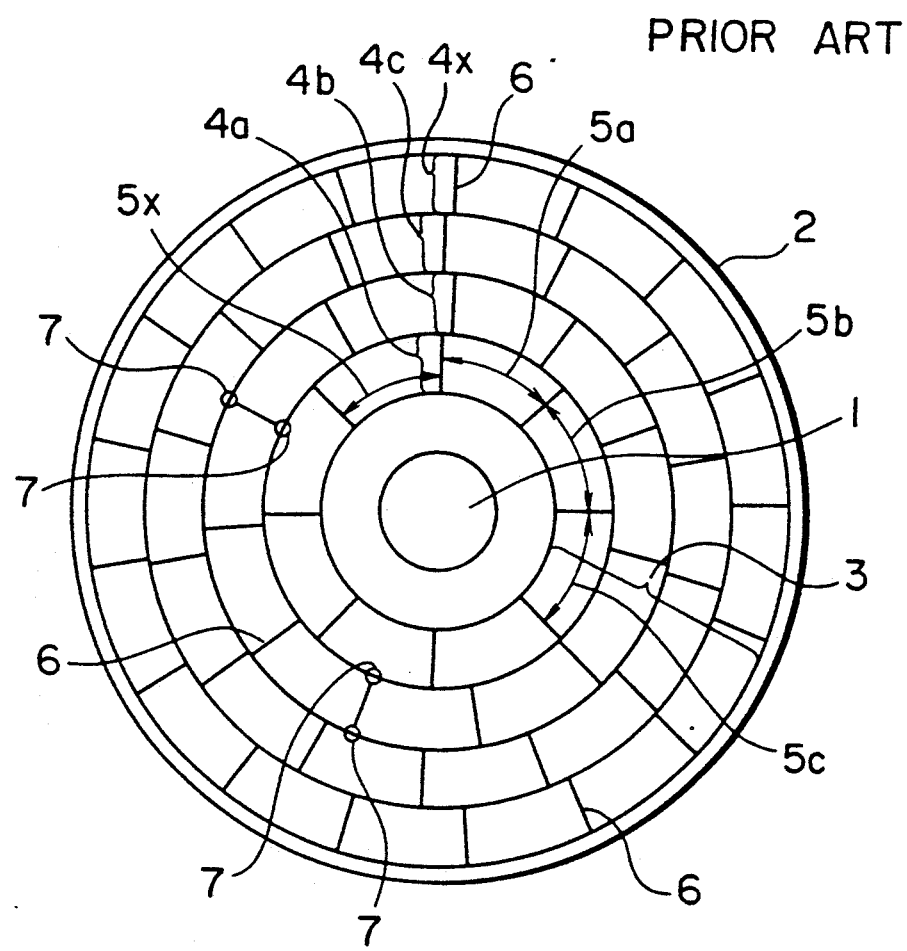
Figure 19:
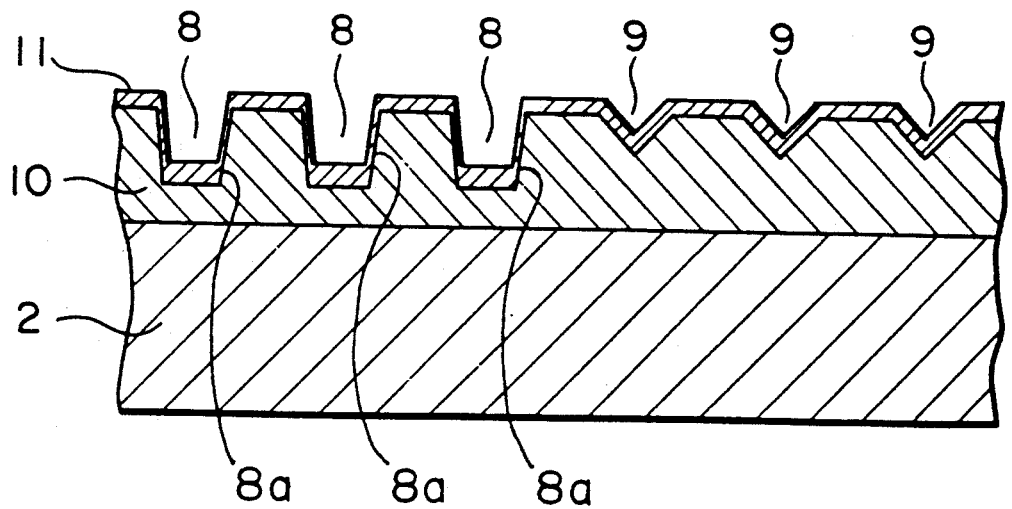
Figure 20:
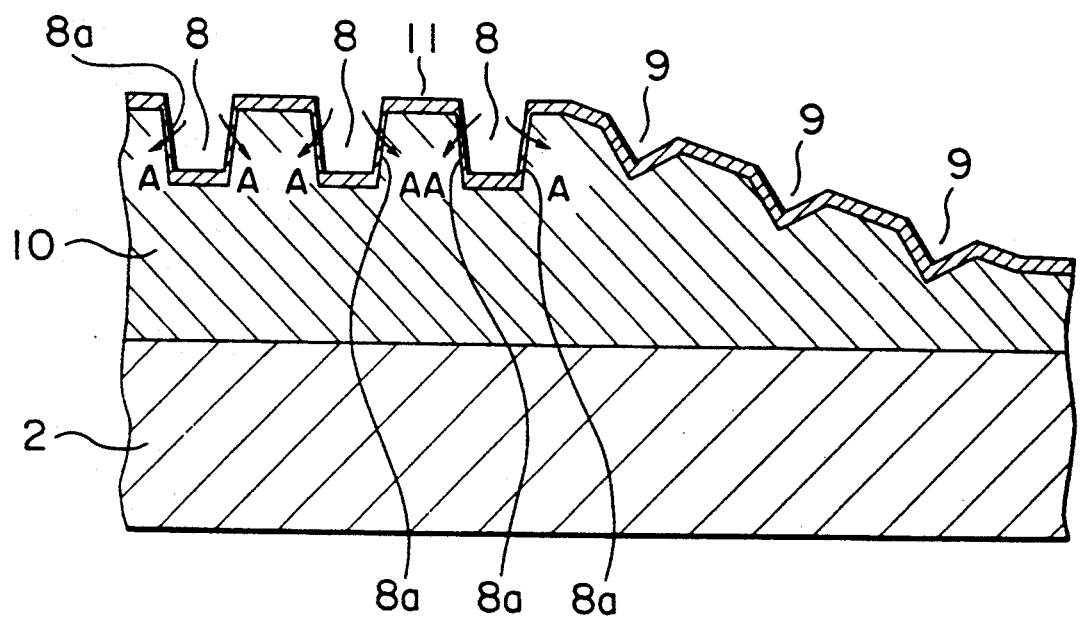
Figure 21:
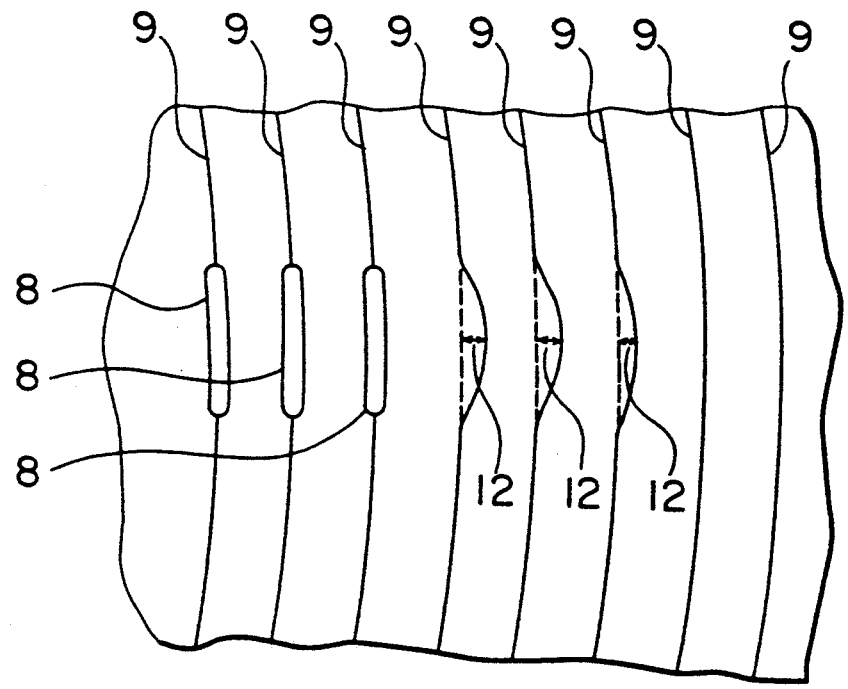

FIG. 17 is a schematic cross sectional view of an optical data recording medium of an example according to the present invention, illustrating a transparent substrate 2, a resin layer 10, 15 a thin film underlayer 15, a thin film layer 11, pregrooves 9, 8 prepits 8 and a silane-coupling agent layer 41.

The transparent substrate 2 is composed of a hard transparent material such as, for example, plate-shaped glass having flat front and back surfaces parallel to each other. The substrate 2 may be formed to any arbitrary outside shape such as, for example, a disc or card shape and the size thereof may be arbitrarily designed.

The silane-coupling agent layer 41 is formed by baking γ-methacryloxy-propyl-trimethoxy-silane to the transparent substrate 2.

Photo curing resin which contains lipophilic group, has permeation to an underlayer material to be described later and does not dissolve to the underlayer material is used to form the resin layer 10. This kind of ultraviolet ray curing resin includes resin containing a cyclic ether compound in a resin matrix.

Note that any cyclic ether compound such as tetrahydrofurfuryl acrylate, tetrahydroflufryl methacrylate, glycidyl acrylate, glycidyl methacrylate, denatured substances thereof may be used as the above cyclic ether compound.

Although a content of the cyclic ether compound in the resin matrix can be suitably adjusted taking into consideration the repellency of the resin, the permeation to the underlayer material and the non-dissolubility to the underlayer material, it is preferably adjusted to 5-60 wt %.

The thin film underlayer 15 is provided to improve a recording sensitivity of the thin film layer 11 and composed of a substance (referred to as the underlayer material) mainly composed of an organic compound such as nitrocellulose, polyvinyl alcohol, nitric polyvinyl alcohol, guanine, a plasma polymerized compound of hydrocarbon or one or more kinds of compounds selected from the group consisting of these organic compounds and the above ultraviolet ray curing resin permeating into the underlayer material.

Note that when nitrocellulose is used as the underlayer material, the nitrocellulose preferably includes 11.9-12.2 (%) of nitrogen, has an average degree of substitution of 2.1-2.3 and viscosity of 850-1000 (sec) since it has a good coating property to a stamper and an increased advantages to improve a recording sensitivity.

When the transparent disc 2 can be formed to a disc shape, the pregrooves 9 can be concentrically or spirally formed about the center of the rotation of the transparent disc 2 and when the transparent substrate 2 is formed to a card shape, they can be formed in parallel.

The prepits 8 can be overlapped on the above pregrooves 9 or interposed between adjacent pregrooves 9.

The thin film layer 11 can be formed using any known arbitrary recording film material of such as an ablation type (e.g., a low melting point alloy type and organic dye type), magneto-optical type (e.g., amorphous alloy or crystalline alloy mainly composed of, for example, transition metal and rare earth metal), and phase changing type (e.g., making use of a phase-changing feature of amorphous-crystalline) or a reflecting film material such as aluminum.

A recording single plate of this embodiment can be produced by the method shown in FIGS. 2 (a)–(d).

Experimental examples of the optical data recording mediums according to this embodiment will be compared below with the optical data recording mediums according to a prior art.

Each of the optical data recording mediums according to the respective experimental examples and comparative examples 1–3 comprises a resin layer 3 composed of ultraviolet ray curing resin, which is obtained in such a manner that 2-hydroxy-2-methyl-1-phenylpropane-1-on having the following molecular structural formula (q) as a photo polymerization initiator is added to the mixture of two or more kinds of organic compounds having the following molecular structural formulas (a)–(n) and the mixture is stirred to be uniform. The optical data recording medium according to a comparative example 4 comprises a resin layer composed of ultraviolet ray curing resin, which is obtained in such a manner that 2-hydroxy-2-methyl-1-phenylpropane-1-on having the following molecular structural formula (q) as a photo polymerization initiator is added to the mixture of organic compounds having the following molecular formulas (a), (o) and (p) and the mixture is stirred to be uniform. The other conditions are determined based on the manufacturing method shown in FIGS. 2(a)–(d).

Molecular structural formula (a)

$$CH_2=CCOOC_2H_4OCN \underset{CH_3}{\overset{O}{\|}} \underset{N}{\overset{CH_3}{\|}} \underset{N}{\overset{O}{\|}} NCOC_2H_4-(CH-CH_2)_n(CH=CH_2)_n$$

average molecular weight: 2000 (product of Nippon Soda Co., Ltd. TE 2000)

Molecular structural formula (b)

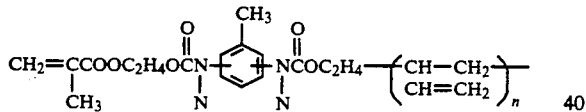

Molecular structural formula (c)

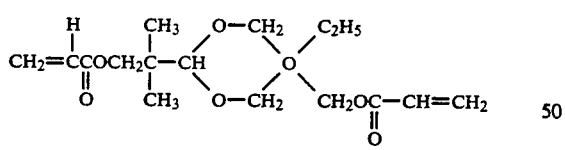
(n = 14-15)

Molecular structural formula (d)

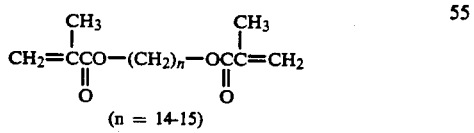
(n = 14-15)

Molecular structural formula (e)

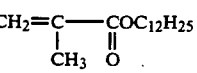

Molecular structural formula (f)

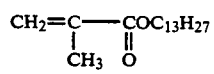

Molecular structural formula (g)

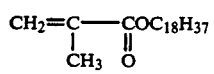

Molecular structural formula (h)

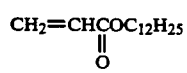

Molecular structural formula (i)

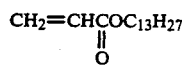

Molecular structural formula (j)

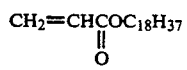

Molecular structural formula (k)

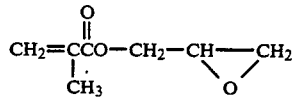

Molecular structural formula (l)

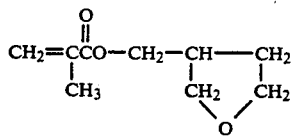

Molecular structural formula (m)

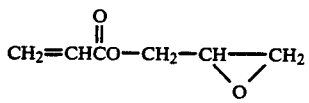

Molecular structural formula (n)

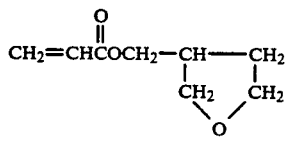

Molecular structural formula (o)

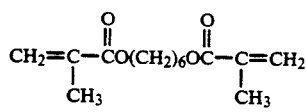

Molecular structural formula (p)

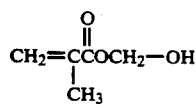

Molecular structural formula (q)

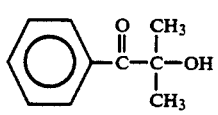

Table 8 shows the compositions of the resin layers according to the experimental examples and the comparative examples. Components (a)–(q) represent the substances having the above respective molecular structural formulas (a)–(q).

TABLE 8

[wt parts]

| *Component | Experimental Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| a | 30 | 30 | 20 | 30 | 20 | 30 | 20 | 20 | 20 | 30 | 30 | 50 |
| b | 20 | 20 | 20 | 30 | 20 | 20 | 30 | 20 | 15 | — | 50 | — |
| c | — | — | 10 | — | — | 10 | — | — | — | 30 | — | — |
| d | 45 | — | — | — | — | — | — | — | — | — | — | — |
| e | — | 30 | — | — | — | — | — | — | — | — | — | — |
| f | — | — | 40 | — | — | — | — | — | — | — | — | — |
| g | — | — | — | 5 | — | — | — | — | — | — | — | — |
| h | — | — | — | — | 10 | — | — | — | — | — | — | — |
| i | — | — | — | — | — | 40 | — | — | — | — | — | — |
| j | — | — | — | — | — | — | 20 | — | — | 40 | 20 | — |
| k | 5 | — | — | — | — | — | — | — | — | — | — | — |
| l | — | 20 | — | — | 50 | — | — | 60 | — | — | — | — |
| m | — | — | 10 | — | — | 10 | — | — | 65 | — | — | — |
| n | — | — | — | 35 | — | — | 30 | — | — | — | — | — |
| o | — | — | — | — | — | — | — | — | — | — | — | 20 |
| p | — | — | — | — | — | — | — | — | — | — | — | 30 |
| q | 2 | 2 | 2 | 2 | 2 | 2 | 2 | 2 | 2 | 2 | 2 | 2 |

Table 9 shows the result of various tests effected to the above experimental examples and comparative examples.

Test 1 is a water absorption test for measuring water absorption of a resin layer with a unit of wt % after a recording single plate is immersed in water at 20° C. for 7 days.

Test 2 is a tracking noise test for measuring a tracking noise in such a manner that after a recording single plate is aged in an environment of 20° C. and 50% RH for 24 hour and fabricated to an air sandwich structure, it is mounted on a reproducing device to measure tracking noise read from the pregrooves thereof with a unit of %.

Test 3 is a closely bonding property test of a substrate with a resin layer, the test being carried out in such a manner that after the resin layer is transferred to the transparent substrate and the resin layer is cured, each 11 horizontal and vertical slits are defined so that the slits arrive at the surface of the transparent substrate from the surface of the resin layer (using a sharp knife) and the number of exfoliated square portions out of 100 pieces of the thus formed square portions is counted with a unit of pieces. This test is based on the cross hatch closely bonding force test regulated by K5400 in JIS. The unit is piece.

Test 4 is an exfoliating property test of a replica which is evaluated based on whether a disadvantage of a crack or the like is caused to a transparent substrate when the replica is exfoliated from a stamper. Symbol ⊚ in the table shows that no disadvantage is caused and symbol x shows a crack is caused. In addition, symbol ○ shows that although a crack is not caused, it is a little difficult to exfoliate the replica.

Test 5 is a transferring property test of a preformat pattern which is carried out in such a manner that an optical disc fabricated to an air sandwich structure is mounted on a reproducing device to read out prepit signals, whereby whether a signal level and signal waveform are normal or not is evaluated. Symbol ⊚ in the table show that the signal level and signal waveform is very good and symbol x shows that they are bad. In addition, symbol ○ shows that although they are not very good, they satisfy the performance required in practical application.

Test 6 is a thickness uniformity test of a recording layer which is evaluated in such a manner that an optical disc fabricated to an air sandwich structure is mounted on a reproducing device to measure the dispersion of the intensity of light reflected from the optical disk. Symbol ⊚ in the table shows that the thickness uniformity of the recording layer is very good and symbol x shows that it is bad. In addition, symbol ○ shows that although it is not very good, it satisfies the performance required in practical application.

TABLE 9

| No. | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Test 1 | 0.4 | 0.5 | 0.5 | 0.6 | 0.6 | 0.5 | 0.5 | 0.7 | 1.0 | 0.3 | 0.3 | 0.3 |
| Test 2 | <10% | <10% | <10% | <10% | <10% | <10% | <10% | <10% | <15% | <10% | <10% | >30% |
| Test 2 | 100 | 100 | 100 | 100 | 100 | 100 | 100 | 100 | 100 | 100 | 0 | 100 |
| Test 4 | ⊚ | ⊚ | ⊚ | ⊚ | ⊚ | ⊚ | ⊚ | ⊚ | ⊚ | ○ | x | ⊚ |
| Test 5 | ⊚ | ⊚ | ⊚ | ⊚ | ⊚ | ⊚ | ⊚ | ⊚ | ⊚ | x | ○ | ⊚ |
| Test 6 | ⊚ | ⊚ | ⊚ | ⊚ | ⊚ | ⊚ | ⊚ | ⊚ | x | ⊚ | ○ | ⊚ |

As shown in FIG. 9, the optical data recording mediums of the comparative examples 1–4 have a drawback in at least one of the characteristics of water absorption of a resin layer, tracking noise, a closely bonding property of a transparent substrate with a resin layer, an exfoliating property when a replica is produced, a transferring property of a preformat pattern and thickness uniformity of a recording layer, whereas all of the optical discs of the experimental examples 1–8 are excellent in all the characteristics.

Note that although the above experimental examples are described with reference to only the cases wherein nitrocellulose is used as an underlayer material, it is confirmed that substantially the same effect can be obtained even when the other of the above underlayer materials are used.

As described above, the optical discs of the present embodiment restrict the formation of a dead zone caused by the swelling of a resin layer and the inferior exfoliating property of a stamper from a replica, whereby a recording capacity is improved.

The present invention is applicable to an optical data recording medium such as, for example, an optical card or the like in addition to the optical disc. Further, in this embodiment, the various optical discs shown in FIGS. 3–6 can be fabricated from the recording single plate shown in FIG. 17.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed:

1. A method of manufacturing an optical data recording medium comprising providing a transparent substrate, forming a transfer layer having a preformat pattern on said transparent substrate, said transfer layer comprising a resin layer in contact with said substrate and a recording film underlayer on said resin layer, said resin layer comprising a mixture of one or more ultraviolet ray absorbing organic compounds which contain lypophilic groups, and a photopolymerization initiator, polymerizing said transfer layer by irradiating with ultraviolet rays, said resin layer having a film thickness (d) of 30–100 μm at the time of the formation thereof and a ratio of swelling (Δd/d), representing the rate of an amount of swelling (Δd) of the film thickness of the resin layer, which is caused when said resin layer absorbs moisture during fabrication, to the film thickness (d) of said resin layer, of 0.1% or less; and forming a thin film water impermeable layer inclusive of a recording film on said transfer layer.

2. A method of manufacturing an optical data recording medium according to claim 1, wherein said ultraviolet ray absorbing organic compounds are selected from at least one of the following molecular structural formulas:

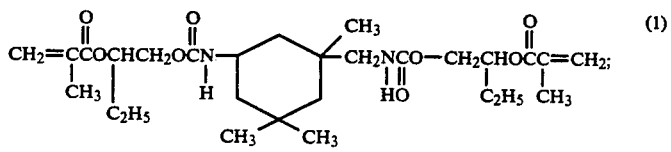

and

3. A method of manufacturing an optical data recording medium according to claim 1, wherein said ultraviolet ray absorbing organic compounds are selected from at least one of the following molecular structural formulas:

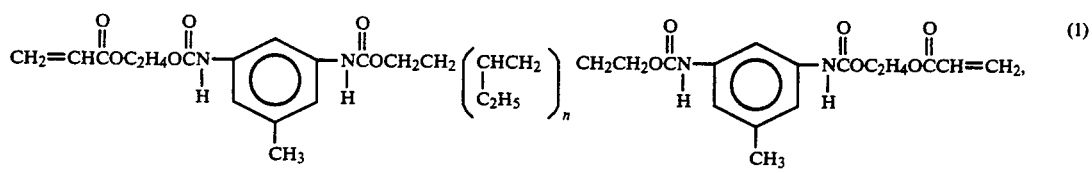

wherein n is an integer and

4. A method of manufacturing an optical data recording medium according to claim 1, wherein said ultraviolet ray absorbing organic compounds are selected from at least one of the following molecular structural formulas:

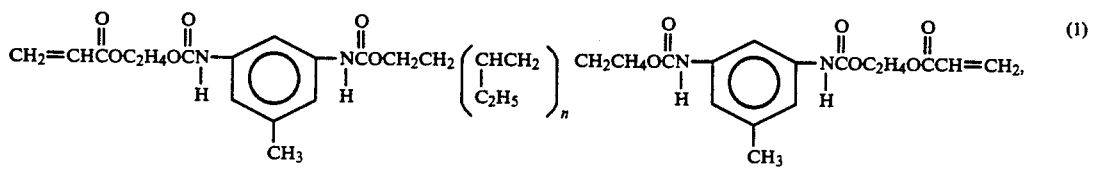

wherein n is an integer and

-continued

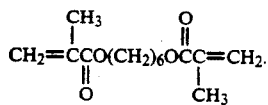
(2)

5. A method of manufacturing an optical data recording medium according to claim 1, wherein said ultraviolet ray absorbing organic compounds are selected from at least one of the following molecular structural formulas:

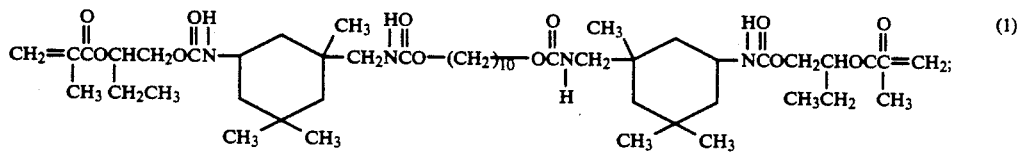
(1)

(2)

(3)

6. A method of manufacturing an optical data recording medium according to claim 1, wherein said ultraviolet ray absorbing organic compounds are slected from at least one of the following molecular structural formulas:

7. A method of manufacturing an optical data recording medium according to claim 1, wherein said ultraviolet ray absorbing organic compounds are selected from at least one of the following molecular structural formulas:

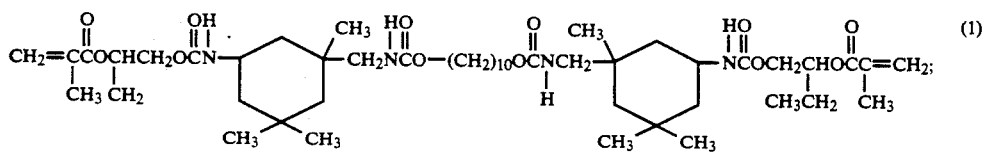
(1)

(2)

(3)

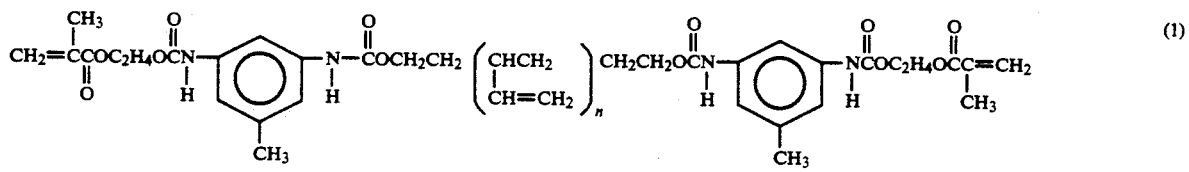
(1)

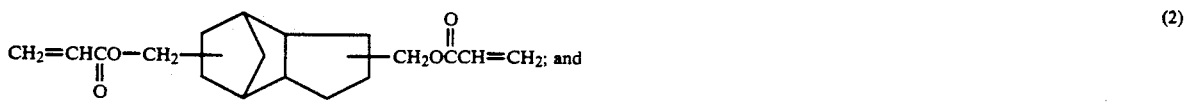
(2)

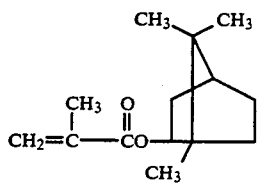

(3)

8. A method of manufacturing an optical data recording medium according to claim 1, wherein said ultraviolet ray absorbing organic compounds are selected from at least one of the following molecular structural formulas:

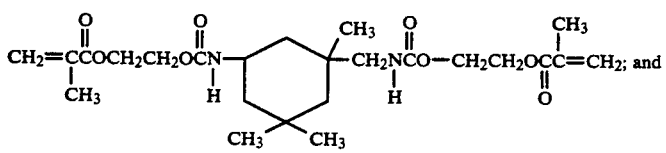
(1)

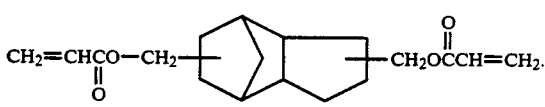
(2)

9. A method of manufacturing an optical data recording medium according to claim 1, wherein said thin film water-impermeable layer including said recording film is formed by sputtering, in a vacuum chamber having its gaseous pressure adjusted to $5 \times 10^{-1}$ Pa or more.

10. A method of manufacturing an optical data recording medium according to claim 1, wherein said thin film water-impermeable layer including said recording film is formed by effecting vacuum vapor deposition such that a set angle of said transfer resin layer to a vaporizing source is varied as time passes when said water-impermeable thin film layer is formed by said vacuum vapor deposition.

11. A method of manufacturing an optical data recording medium according to claim 1, wherein said thin film water-impermeable layer including said recording film is formed by means or plasma chemical vapor deposition.

12. A method of manufacturing an optical data recording medium according to any of claims 2-8, wherein said recording film underlayer is comprised of an organic compound selected from at least one of nitrocellulose, and a fluorine-containing resin.

13. A method of manufacturing an optical data recording medium according to any of claim 2-8, wherein said transparent substrate has a silane-coupling agent layer formed thereon between said substrate and said transfer layer, whereby said transfer layer is bonded to said transparent substrate by way of said silane-coupling agent.

14. A method of manufacturing an optical data recording medium comprising a transparent substrate, a transfer layer of a preformat pattern format on said transparent substrate and a thin film layer formed on said transfer layer, comprising the steps of:
providing a transparent substrate,
providing a stamper having a preformat pattern on a surface thereof,
forming a recording film underlayer comprising an organic compound on said preformat pattern surface of said stamper,
providing an ultraviolet ray curable resin comprising a mixture of one or more ultraviolet ray absorbing organic compounds which contain lipophilic groups and a photo polymerization initiator on said recording film underlayer,
forming a sandwich configuration between said transparent substrate and said stamper, recording film underlayer and ultraviolet ray curable resin,
pressing and ultraviolet ray curable resin between said transparent substrate and said stamper such that said ultraviolet ray absorbing organic compounds permeate into but are not dissolved in said recording film underlayer, to produce a transfer layer comprising said ultraviolet ray curable resin and said recording film underlayer, wherein said transfer layer contacts said transparent substrate such that at least that surface of said transfer layer in contact with said transparent substrate is inclusive of said ultraviolet ray curable resin,
polymerizing said transfer layer by irradiating said sandwich configuration with ultraviolet rays, said transfer layer having a thickness (d) of 30-100 μm at the time of the formation thereof and a ratio of swelling (Δd/d), representing the rate of an amount of swelling (Δd) of said transfer layer, which results when said transfer layer absorbs moisture during fabrication, to the thickness (d) of said transfer resin layer, of 0.1% or less,
exfoliating said stamper from said transfer layer inclusive of said recording film underlayer and said ultraviolet ray curable resin, whereby said transfer layer is transferred to said transparent substrate, and
thereafter forming a thin film water-impermeable layer inclusive of a recording film over an overall surface of said transfer layer.

15. A method of manufacturing an optical data recording medium according to claim 14, wherein said thin film water-impermeable layer, including said recording film and a reflecting film, is formed on said surface of said transfer layer inclusive of said recording film underlayer having a preformat pattern thereon, by sputtering in a vacuum chamber adjusting gaseous pressure to $5 \times 10^{-1}$ Pa or more.

16. A method of manufacturing an optical data recording medium according to claim 14, wherein said thin film water-impermeable layer, including said recording film and a reflecting film, is formed on said overall surface of said transfer layer inclusive of said recording film underlayer having a preformat pattern thereon, by effecting vacuum vapor deposition such that a set angle of said transfer layer to a vaporizing source is varied as time passes when said thin film water-impermeable layer is formed by said vacuum vapor deposition.

17. A method of manufacturing an optical data recording medium according to claim 14, wherein said thin film water-impermeable layer, including said recording film and a reflecting film, is formed on said overall surface of said transfer layer inclusive of said recording film underlayer having a preformat pattern thereon, by means of plasma chemical vapor deposition.

18. An optical data recording medium comprising at least a transparent substrate, a transferred layer of a preformat pattern formed on the transparent substrate and a thin film layer formed on the transferred layer wherein at least the surface of the transferred layer in contact with the transparent substrate is made of a resin layer composed of an ultraviolet ray curable resin and the thin film layer isolates the optical data recording medium from the atmosphere when the fabrication of the optical data recording medium is completed, manufactured by a process comprising the steps of:
  forming a transfer resin layer composed of a mixture of one or more ultraviolet ray absorbing organic compounds which contain lipophilic groups, and a photo polymerization initiator on a transparent substrate, and
  polymerizing said resin layer by irradiating with ultraviolet rays, wherein said resin layer has a film thickness (d) of 30–100 μm at the time of the formation thereof and a ratio of swelling ($\Delta d/d$), representing the rate of an amount of swelling ($\Delta d$) of the film thickness of the resin layer, which is caused when said resin layer absorbs moisture during fabrication, to the film thickness (d) of said resin layer, of 0.1% or less.

19. An optical data recording medium comprising at least a transparent substrate, a transferred layer of a preformat pattern formed on the transparent substrate and a thin film layer formed on the transferred layer wherein at least the surface of the transferred layer in contact with the transparent substrate is composed of an ultraviolet ray curable resin and the thin film layer isolates said optical data recording medium from the atmosphere when the fabrication of the optical data recording medium is completed, manufactured by a process comprising the steps of:
  forming a recording film underlayer composed of an organic compound on a preformat pattern surface of a stamper,
  forming said transferred layer composed of a mixture of one or more ultraviolet ray absorbing organic compounds which contain lipophilic groups and a photo polymerization initiator on a surface of said recording film underlayer, such that said ultraviolet ray absorbing organic compounds permeate into said recording film underlayer in such a way that said ultraviolet ray absorbing organic compounds are not dissolved in said recording film underlayer,
  polymerizing said transferred layer and said recording film underlayer by irradiating with ultraviolet rays, said resulting resin layer having a film thickness (d) of 30–100 μm at the time of the formation thereof and a ratio of swelling ($\Delta d/d$), representing the rate of an amount of swelling ($\Delta d$) of the film thickness of the resin layer, which results when said resin layer absorbs moisture during fabrication, to the film thickness (d) of said resin layer, of 0.1% or less,
  exfoliating said stamper from said recording film underlayer as said resin layer is transferred to a transparent substrate, and
  thereafter forming at least one thin film having water-impermeability to a thickness capable of cutting off water in the air over the overall surface of said resin layer.

* * * * *